(12) United States Patent
Peinetti et al.

(10) Patent No.: US 7,068,174 B1
(45) Date of Patent: Jun. 27, 2006

(54) METHOD AND APPARATUS FOR COMMUNICATING AN ANIMAL CONTROL SIGNAL

(75) Inventors: Donald L. Peinetti, Auburn, IN (US); William P. Moore, Fort Wayne, IN (US)

(73) Assignee: Innotek, Inc., Garrett, IN (US)

( * ) Notice: Subject to any disclaimer, the term of this patent is extended or adjusted under 35 U.S.C. 154(b) by 189 days.

(21) Appl. No.: 10/830,161

(22) Filed: Apr. 21, 2004

Related U.S. Application Data

(60) Provisional application No. 60/528,629, filed on Dec. 10, 2003.

(51) Int. Cl.
*G08B 23/00* (2006.01)

(52) U.S. Cl. .................................. 340/573.3; 119/720
(58) Field of Classification Search ............. 340/573.3, 340/573.1; 119/720, 721; 375/286, 289
See application file for complete search history.

(56) References Cited

U.S. PATENT DOCUMENTS

| | | | |
|---|---|---|---|
| 3,589,337 A | 6/1971 | Doss | |
| 4,898,120 A | 2/1990 | Brose | |
| 4,967,695 A | 11/1990 | Giunta | |
| 4,996,945 A | 3/1991 | Dix, Jr. | |
| D330,173 S | 10/1992 | Juliana et al. | |
| D330,685 S | 11/1992 | Juliana et al. | |
| 5,161,485 A | 11/1992 | McDade | |
| 5,207,178 A | 5/1993 | McDade et al. | |
| D336,055 S | 6/1993 | Juliana et al. | |
| 5,353,744 A | 10/1994 | Custer | |
| 5,381,129 A | 1/1995 | Boardman | |
| 5,408,956 A | 4/1995 | Quigley | |
| 5,425,330 A | 6/1995 | Touchton et al. | |
| 5,435,271 A | 7/1995 | Touchton et al. | |
| 5,445,900 A | 8/1995 | Miller, Jr. et al. | |
| 5,476,729 A | 12/1995 | Miller, Jr. et al. | |
| 5,533,469 A | 7/1996 | Touchton et al. | |
| 5,559,498 A | 9/1996 | Westrick et al. | |
| 5,576,694 A | 11/1996 | Touchton et al. | |
| 5,606,936 A | 3/1997 | Davis | |
| 5,636,597 A | 6/1997 | Van Curen et al. | |
| 5,642,690 A | 7/1997 | Calabrese et al. | |
| 5,787,841 A | 8/1998 | Titus et al. | |
| 5,799,618 A | 9/1998 | Van Curen et al. | |
| 5,808,551 A | 9/1998 | Yarnall, Jr. et al. | |
| 5,870,973 A | 2/1999 | Touchton et al. | |
| 5,886,672 A | 3/1999 | Brune et al. | |
| 5,911,198 A | 6/1999 | Curen et al. | |
| 5,913,284 A | 6/1999 | Van Curen et al. | |
| 5,923,254 A | 7/1999 | Brune | |
| 5,987,379 A | 11/1999 | Smith | |
| 6,043,748 A | 3/2000 | Touchton et al. | |
| 6,058,889 A | 5/2000 | Van Curen et al. | |
| 6,073,589 A | 6/2000 | Curen et al. | |
| 6,075,443 A | 6/2000 | Schepps et al. | |
| 6,114,957 A | 9/2000 | Westrick et al. | |
| 6,155,208 A * | 12/2000 | Schell et al. ................. | 119/720 |
| 6,163,261 A | 12/2000 | Westrick | |
| 6,166,643 A | 12/2000 | Janning et al. | |
| 6,184,790 B1 | 2/2001 | Gerig | |
| 6,232,880 B1 | 5/2001 | Anderson et al. | |

(Continued)

*Primary Examiner*—Thomas Mullen
(74) *Attorney, Agent, or Firm*—Townsend and Townsend and Crew LLP

(57) ABSTRACT

A system for controlling pets utilizes a low power transmitter to create avoidance zones in which one pet wearing an animal control receiver can enter but in which a second pet is deterred from entering.

20 Claims, 26 Drawing Sheets

U.S. PATENT DOCUMENTS

| | | |
|---|---|---|
| 6,271,757 B1 | 8/2001 | Tpuchtpm et al. |
| 6,327,999 B1 | 12/2001 | Gerig |
| 6,360,697 B1 | 3/2002 | Williams |
| 6,415,742 B1 * | 7/2002 | Lee et al. ............... 119/721 |
| 6,431,122 B1 | 8/2002 | Westrick et al. |
| 6,459,378 B1 | 10/2002 | Gerig |
| 6,487,992 B1 | 12/2002 | Hollis |
| 6,581,546 B1 | 6/2003 | Dalland et al. |
| 6,600,422 B1 | 7/2003 | Barry et al. |
| 6,799,537 B1 | 10/2004 | Liao |
| 6,825,768 B1 | 11/2004 | Stapelfeld et al. |
| 6,901,883 B1 * | 6/2005 | Gillis et al. ............ 119/720 |
| 6,956,483 B1 | 10/2005 | Schmitt et al. |
| 2002/0036569 A1 | 3/2002 | Martin |
| 2005/0217606 A1 | 10/2005 | Lee et al. |

* cited by examiner

METHOD AND APPARATUS FOR COMMUNICATING AN ANIMAL CONTROL SIGNAL

CROSS-REFERENCES TO RELATED APPLICATIONS

This application claims the benefit of U.S. Provisional Application No. 60/528,629, entitled "System for Communicating Control Signals" and filed on Dec. 10, 2003 the contents of which are hereby incorporated by reference in its entirety for all purposes.

This application is being filed concurrently with related U.S. patent application Ser. Nos. 10/829,916, filed Apr. 21, 2004, entitled "Method and Apparatus for Communicating Control Signals"; 10/829,915, filed Apr. 21, 2004, entitled "Method and Apparatus for Communicating A Randomized Signal"; 10/830,174, filed Apr. 21, 2004, entitled "Method and Apparatus for Varying Animal Correction Signals" all of which are hereby incorporated by reference for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

Various embodiments of the invention relate generally to a system for controlling an animal. One particular embodiment relates to a system for transmitting a low power signal for use in keeping pets out of specific areas.

BACKGROUND

Many pet owners experience a variety of problems inside the home caused by their pets getting into areas that the owner would like to keep them out of. For example, dogs getting into trash cans, cats climbing on tables and both cats and dogs climbing on couches are examples of such problems.

To combat this problem, electronic transmitter/collar systems have been used. Such systems operate by producing an electromagnetic field in a spherical pattern. This requires a significant amount of power in order to generate a strong enough field. Therefore, this has necessitated that the transmitter be an alternating current powered unit that is supplied from a wall outlet.

However, many of the locations that owners desire to keep their pets out of are not necessarily located next to a wall outlet. Therefore, to locate a transmitter in one of these locations would require that power cords be run across the room from the wall outlet. This is clearly an undesirable solution. For example, couches located in the middle of a large room or a significant distance from a wall outlet cannot be easily supplied with A/C power. As another example, keeping dogs from drinking out of a toilet is difficult to achieve as many bathrooms do not have wall outlets located close to the toilet. In addition, even though wall outlets may be located close to some areas, it is often desirable to use the wall outlets for other items. For example, there are often wall outlets located close to a bed (which one often desires to keep a pet off of); however, those outlets are preferably used for clock radios and reading lights. Consequently, the A/C powered units are oftentimes very inconvenient to use.

While in many instances a single transmitter will suffice for protecting an area of the home, in some instances it is desirable to protect a larger area than can be accommodated with a single unit. In that situation, it can sometimes be difficult to use more than one unit to protect the large area. This is due to the fact that the units transmit the same signal in a spherical pattern. When placed near one another, the signals produced by the transmitters can cancel. When the signals cancel one another, a dead zone is created in which the pet can move freely. This may be the very place that the pet owner wants to keep the pet from entering. As a result, the effective use of two units close to one another which are transmitting the same signal is sometimes difficult to achieve.

Another difficulty encountered by pet owners is that not all of their pets need to be kept away from certain areas. For example, a pet owner's unruly dog may need to be kept away from the front door in order to keep it from jumping up on guests. However, that same pet owner would like the pet cat to be able to enter the zone by the front door. With a system in which the dog's collar and the cat's collar are both triggered by the transmitter signal, it is not possible to create selective zones around the door. Thus, such a system suffers from the fact that it cannot accommodate different avoidance zones for different pets in the same household.

While many animals are capable of being trained to leave an avoidance zone if they enter one, there are sometimes a few that are not deterred by the correction signal used. For example, in some cases, an increasing intensity of the correction signal has been used to cause the most stubborn of animals to leave an avoidance zone. The intensity can only be increased to a maximum intensity—especially for commercially sold systems that must accommodate a diverse group of animals of different sizes. Thus, in the past, one had to accept that for those animals that could not be deterred by the maximum intensity correction signal that the system would not be as useful.

SUMMARY

According to one embodiment of the invention, a system is provided for use in controlling an animal, comprising providing a digital message for communication to a receiver; providing a carrier wave for transmission to the receiver; transmitting the carrier wave in accordance with the digital message so as to transmit the carrier wave in accordance with each occurrence of a first digital signal in the digital message and so as not to transmit the carrier wave in accordance with each occurrence of a second digital signal in the digital message; powering the transmission with only battery power.

According to another embodiment of the invention, a system is provided for use in controlling an animal comprising providing a receiver; receiving a carrier wave signal for use in controlling an animal; determining a digital message from the carrier wave signal wherein reception of the carrier wave corresponds to a first digital signal in the digital message and non-reception of the carrier wave corresponds to a second digital signal in the digital message and wherein the second digital signal is opposite in value to the first digital signal; and utilizing the digital message to transmit a correction signal.

According to still another embodiment of the invention, a system is provided comprising providing a transmitter;

powering the transmitter; providing a message for communication to a receiver, wherein the message is configured to implement a routine for application of a specific correction signal to the animal; transmitting the message to the receiver at less than about 0.0167 Watts average power.

Another embodiment of the invention comprises configuring a receiver to receive a signal having a predetermined frequency; detecting a signal; taking a first set of samples of the signal at a plurality of intervals during a first time period corresponding to at least one cycle at the frequency; utilizing the first set of samples to calculate a characteristic of the signal during the first cycle; taking a second set of samples of the signal at a plurality of intervals during a subsequent time period corresponding to at least one cycle at the frequency; utilizing the second set of samples to calculate the characteristic of the signal during the second cycle; comparing the calculated characteristic of the first time period with the calculated characteristic of the subsequent time period so as to determine whether the first cycle and the second cycle of the signal have the predetermined frequency.

Still another embodiment of the invention comprises providing a first avoidance zone transmitter; providing a second avoidance zone transmitter; placing the first avoidance zone transmitter in a first transmission location; placing the second avoidance zone transmitter in a second transmission location; initiating transmission of a control signal from the first avoidance zone transmitter; initiating transmission of the control signal from the second avoidance zone transmitter; varying the initiation of successive transmissions of the control signal from the first avoidance zone transmitter within successive control signal windows.

According to another embodiment of the invention, a system is provided comprising generating a control signal for transmission to an animal control receiver, wherein the control signal is generated for transmission within a control signal window and wherein the control signal window is longer than the control signal; determining a first point in time within the control signal window to begin transmission of the control signal, wherein the first point in time within the control signal window allows for transmission of the control signal within the control signal window; initiating transmission of the control signal at the first point in time.

In accordance with another embodiment of the invention, a system is provided comprising receiving a first control signal from an animal control transmitter; initiating a routine for controlling at least one correction signal to the animal in response to the receiving the first control signal from the animal control transmitter; establishing a control signal window for receipt of a second control signal from the animal control transmitter; checking for the second control signal within the control signal window so as to allow the second control signal to be transmitted at a different initiation point relative to the control signal window from the initiation point of the first control signal.

In yet another embodiment of the invention, a system is provided comprising providing a transmitter; storing one of a plurality of identifiers with the transmitter wherein each of the plurality of identifiers is associated with a corresponding animal; transmitting from the transmitter an animal control signal matching the selected identifier without receiving via an animal control receiver a signal to indicate to the transmitter the presence of the animal in the target zone.

Still another embodiment of the invention comprises receiving an animal control signal from a transmitter, wherein the animal control signal is received without the receiver transmitting a signal to indicate to the transmitter the presence of the animal in a target zone; storing an identifier in a memory, wherein the identifier is associated with one of a plurality of animals; providing a processor configured to initiate a routine for application of the correction signal to the animal if the animal control signal received from the transmitter matches the identifier.

Yet another embodiment of the invention comprises detecting a transmitted signal with a detector indicating the detector is located within a first zone; applying a first sequence of correction signals for controlling the animal; determining whether the animal has not moved from the first zone after the applying the first sequence of correction signals; waiting a period of time after the applying the first sequence of correction signals; in response to the determining that the animal has not moved from the first zone after the period of time, applying a second sequence of correction signals for controlling the animal different from the first sequence of correction signals.

Further embodiments will be apparent from the specification and accompanying claims.

DETAILED DESCRIPTION

Figure 1:
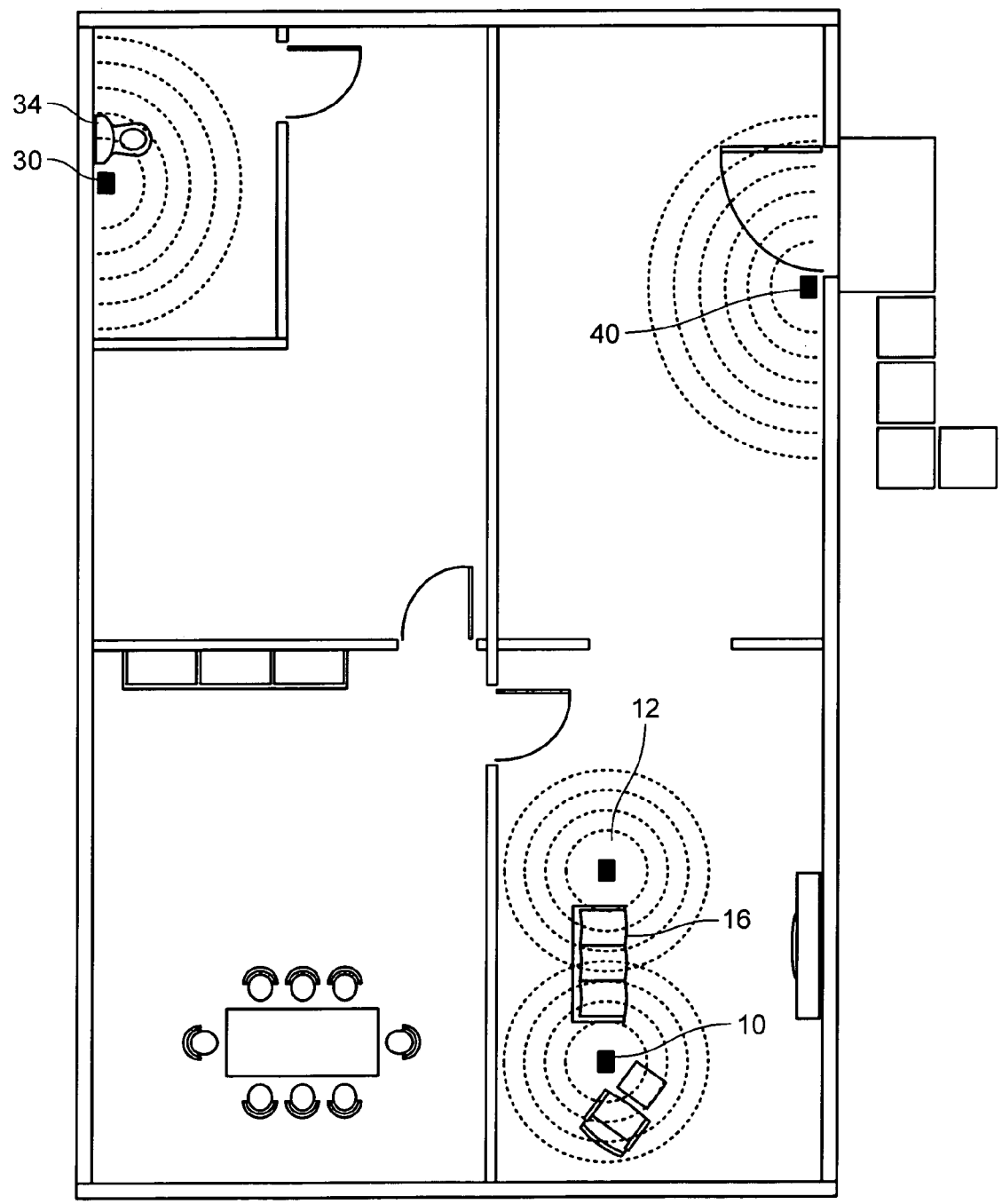
FIG. 1 illustrates a plan view of a home utilizing avoidance zones, according to one embodiment of the invention.

FIG. 1 illustrates an exemplary layout of a home in which some of the embodiments of the invention can be used. For example, FIG. 1 shows transmitters 10 and 12 being placed at the ends of a long couch 16. One might desire to keep pets off a couch. However, for couches placed in the middle of the room or along a wall with few AC outlets, it is difficult to conveniently power the transmitters. Similarly, FIG. 1 shows a transmitter 30 placed near a toilet 34 so as to discourage pets from drinking out of a toilet. Again, AC outlets are not typically conveniently located in bathrooms. Furthermore, running power cords in a bathroom can be dangerous due to the shock hazard. As another example transmitter 40 is placed near a front door in FIG. 1 to keep house pets from running out the door when opened or possibly for keeping dogs from jumping on visitors when they enter the home. Again, the front door area of a home is often one that does not have an AC outlet for providing a power source for the transmitter.

Thus, a battery powered transmitter is necessary in these and other situations. Providing a battery powered transmitter that provides a signal that is of sufficient strength so that it can create a zone of protection has been difficult to achieve until now. While AC units are capable of providing a strong signal with little worry about the power being used to transmit the signal, battery powered units need to be able to generate a signal of sufficient strength while at the same time allowing the signal to be transmitted for several months. This will keep the pet owner from having to change the batteries too frequently. According to one embodiment of the invention, it would be desirable not to have to change a unit powered with 3 "AA" cell batteries for a period of six months. According to other embodiments of the invention, a transmitter that could transmit a signal for 6, 5, 4, or 3 months without requiring replacement of the batteries would be sufficient.

In addition to showing that the transmitters in FIG. 1 are capable of being battery powered, FIG. 1 also shows that the transmitters can be used together to form a large avoidance zone. Namely, FIG. 1 shows that transmitters 10 and 12 can be used together to form an avoidance zone that covers the entire couch 16. This is beneficial in that it allows a large area to be covered with a transmitter/receiver system. While FIG. 1 shows that the avoidance zone is created by units placed at the ends of the couch, one could also place the units underneath the couch to shorten the avoidance zone.

FIG. 1 also shows that different animals can be kept away from different areas. For example, the dashed line signals around transmitter 30 and 40 are intended in this example to correct a dog that might drink from the toilet or run out through the open front door. The signal around couch 16 is intended to correct a cat that might like to scratch or climb on the couch. Regardless of the reason behind placing a transmitter in a location, FIG. 1 illustrates that different animals can enter different avoidance zones that are not programmed to apply to them, while the other animals for which the avoidance zone was designed are kept away from the avoidance zones.

As noted above, the ability to keep pets out of certain areas of the home requires that a battery powered unit be used in order to place a transmitter in an effective location. As a result, the unit needs to be of sufficiently low power so that it can last for a dependably long enough time, e.g., around 3 to 6 months, so as not to be annoying to the consumer who has to replace the batteries.

Figure 2:
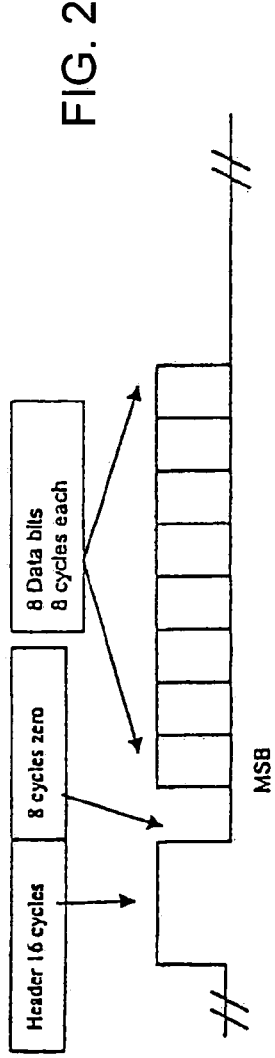
FIG. 2 illustrates a signaling format for communicating between a transmitter and a receiver, according to one embodiment of the invention.

To accomplish a low power transmitter, the signal shown in FIG. 2 can be used. FIG. 2 illustrates that a header signal is used to wake up a receiver. In this example, the header signal is shown as being 16 cycles of the carrier wave. This header is sensed by the receiver which detects the presence of energy. A buffer period of eight cycles is shown in FIG. 2 to separate the header and payload of the data signal. The buffer period can be used to allow the receiver to initialize after being woken up by reception of the header signal. The transmitter then transmits the payload signal which, according to this example, is comprised of 8 data segments. Each of the data segments is transmitted for 8 cycles so as to allow the receiver to determine the value of the data segment. Thus, the transmitter, according to this example can transmit 8 data bits.

To reduce the power requirements of the transmitter, a unique transmission scheme can be used to reduce the number of transmissions that draw current from the power source. The signals that draw current from the power source are the ones that reduce the life of the battery source. For example, a data signal for each data bit in FIG. 2 can be transmitted only when a binary data bit of the value "1" occurs. This allows the transmitter to conserve power by not transmitting a signal, where the lack of transmission during a specific time period indicates to a receiver a binary data bit of the value "0".

Figure 4A:
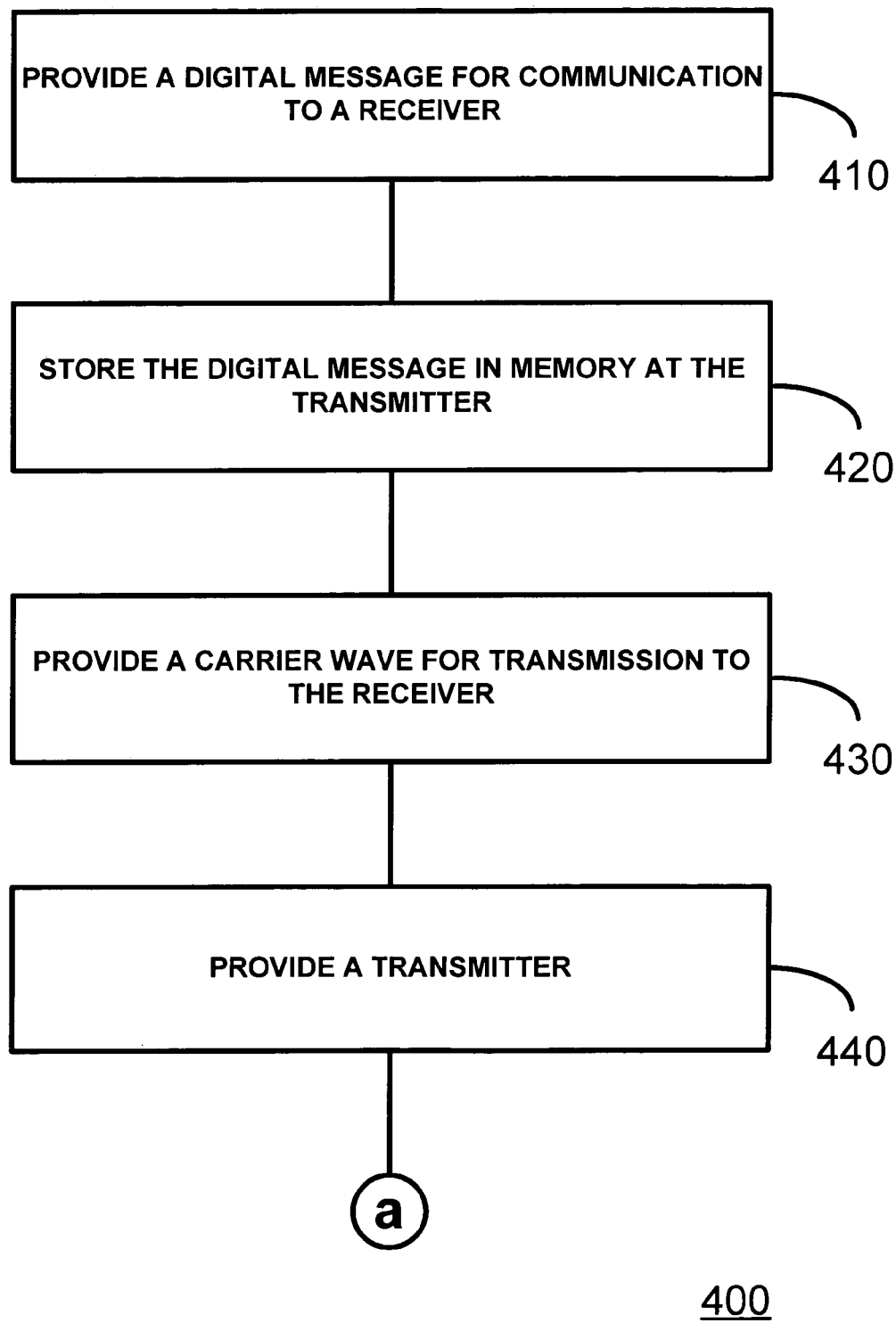
FIGS. 4A and 4B illustrate a flowchart demonstrating a method of transmitting a signal for controlling an animal according to one embodiment of the invention.
Figure 4B:
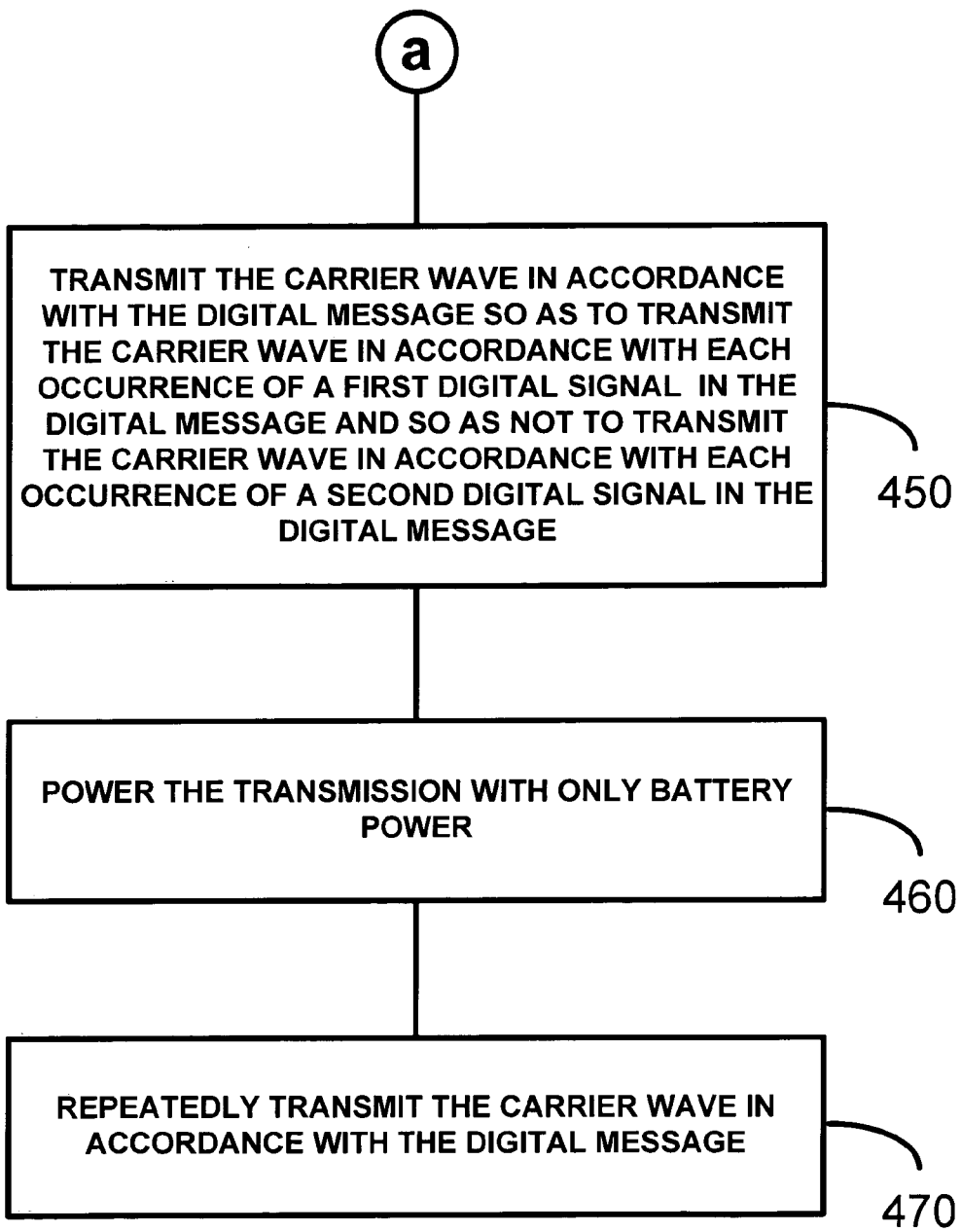

This transmission scheme can be illustrated by flowchart 400 in FIGS. 4a and 4b. In block 410 of flowchart 400, a digital message is provided for communication to a receiver. An example of this is the code "10100000" which can be associated with the message that a correction signal should be applied to a large dog wearing the animal collar programmed with that code. In block 420, the digital message is stored at the transmitter for transmission. A carrier wave, such as a generally sinusoidal wave at 6.25 KHz is provided for use by a transmitter (block 440). The transmitter can then transmit the carrier wave in accordance with the digital message so as to transmit the carrier wave for each occurrence of a first digital signal (e.g., a digital "1") and not to transmit the carrier wave for each occurrence of the opposing digital signal or second digital signal (e.g., a digital "0"). Thus, for the digital payload in FIG. 2 of "10100000", a series of 8 cycles of the carrier wave would be applied, followed by 8 cycles of no transmission of the carrier wave, followed by transmission of another 8 cycles of the carrier wave, followed by no transmission of the carrier wave for yet another 40 cycles. The receiver could then detect what digital message was being conveyed based on the occurrence or lack of occurrence of the carrier wave after the wake up signal.

As shown in block 460, a battery operated unit could be used to transmit this signal since it requires very little power. However, where a transmitter unit is configured with both a battery power mode and an AC power mode, then the AC power mode could transmit in this fashion, as well. It is envisioned that this transmission scheme will be very beneficial when used as a battery powered transmission scheme, however.

Block 470 illustrates that the carrier wave signal is repeatedly transmitted according to the digital message. This allows the receiver assembly worn by the animal to trigger off of the received signal and apply the appropriate correction signal. Thus, for example, the encoded carrier wave signal can be sent repeatedly every 300 ms to convey the 8 bit message. If the animal wearing a collar assembly receiver is standing within an avoidance zone, it can be issued a correction signal every time the 8 bit signal is received.

Figure 3:
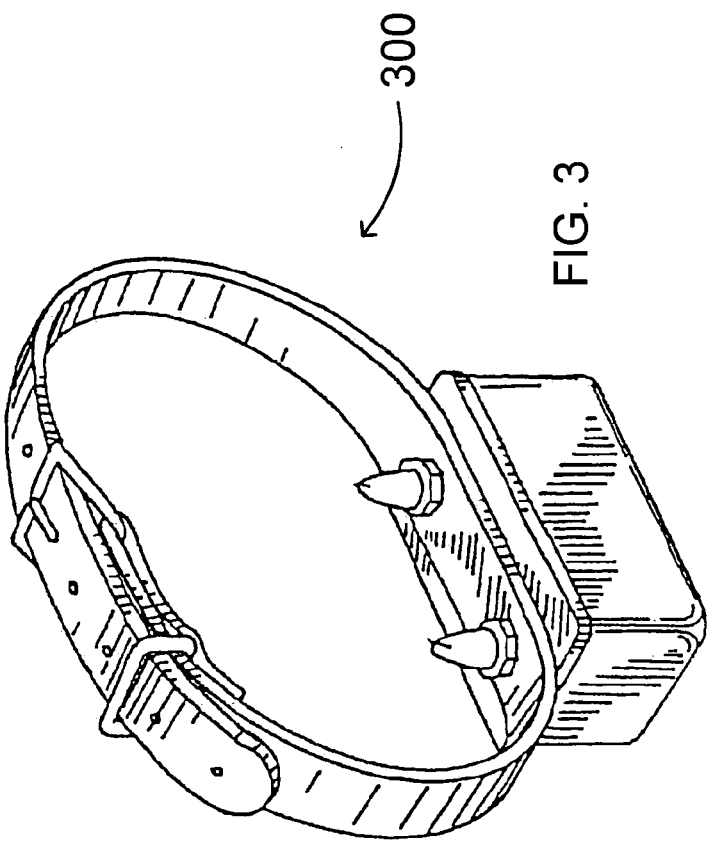
FIG. 3 illustrates an animal collar according to one embodiment of the invention.
Figure 5:
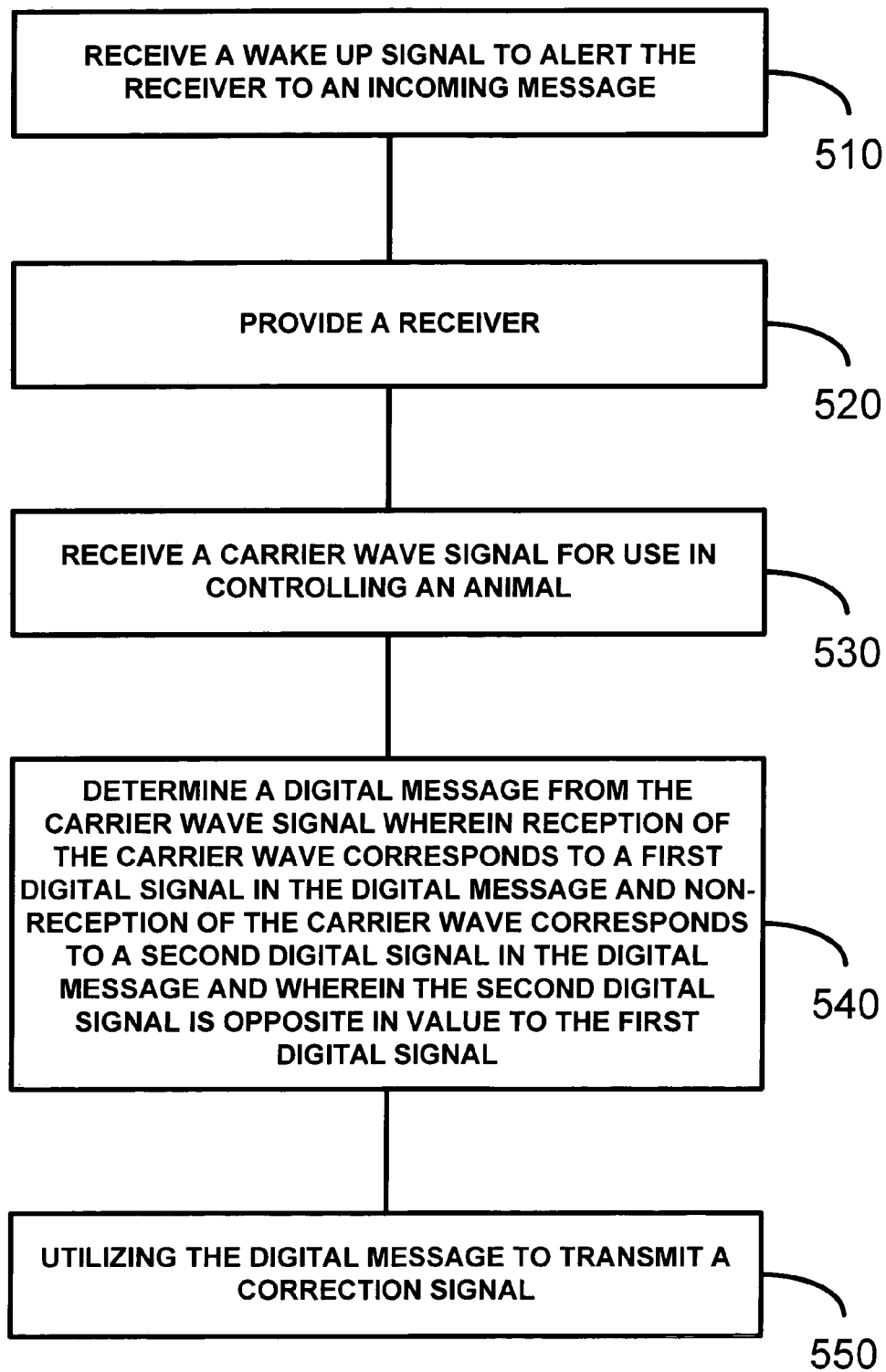
FIG. 5 illustrates a flowchart demonstrating a method of receiving a signal for use in controlling an animal according to one embodiment of the invention.

This reception scheme is illustrated further by flowchart 500 in FIG. 5. In block 510 of FIG. 5, the wake up signal is received by the animal collar receiver to alert the receiver of an incoming message, i.e., the payload in the example of FIG. 2. Thus, a receiver is provided in block 520, such as by fastening an animal collar receiver around the neck of a pet. FIG. 3 illustrates an exemplary animal collar assembly 300. In block 530 a carrier wave signal is received for use in controlling an animal. As explained above, this can involve receiving a series of cycles of a substantially sinusoidal waveform transmitted by the transmitter. The message communicated by the carrier wave signal can be used to control the animal.

In block 540, the digital message is determined from the carrier wave signal, wherein reception of the carrier wave corresponds to a first digital signal in the digital message and non-reception of the carrier wave corresponds to a second digital signal in the digital message. The second digital signal is the opposite of the first digital signal. Therefore, if the first digital signal is a "1" then the second digital signal is a "0" and vice versa. Once the digital message is determined from the carrier wave signal, then the digital message can be used to decide whether to apply a correction signal as shown in block 550, e.g., in the form of a sound or a stimulation signal. According to one example, the digital message can be associated with a specific animal collar. Any animal collar that is programmed with that digital message and receives that digital message would know to apply a correction signal to the pet. Any animal collar not preprogrammed with that digital message and which received that digital message would conclude not to apply the correction signal. Thus, different pets could be controlled by different transmitters—thus keeping cats away from a sofa that they might scratch, while allowing dogs to sleep at the side of the sofa. As another example, the digital message could be indicative of a level of stimulation to apply. Thus, for a house full of big dogs that have a tendency to both get in the trash can in the kitchen as well as run out the front door, a digital signal sent by the transmitter at the trash can could be equated with a weak correction signal while the digital message sent by the transmitter at the front door could be equated with a strong correction signal (since you would want to prevent the dogs from running out the front door and into the traffic). A table look up function in a processor could be used to determine what correction signal to apply for each digital message received. Furthermore, a combination of these examples could be used.

Figure 8:
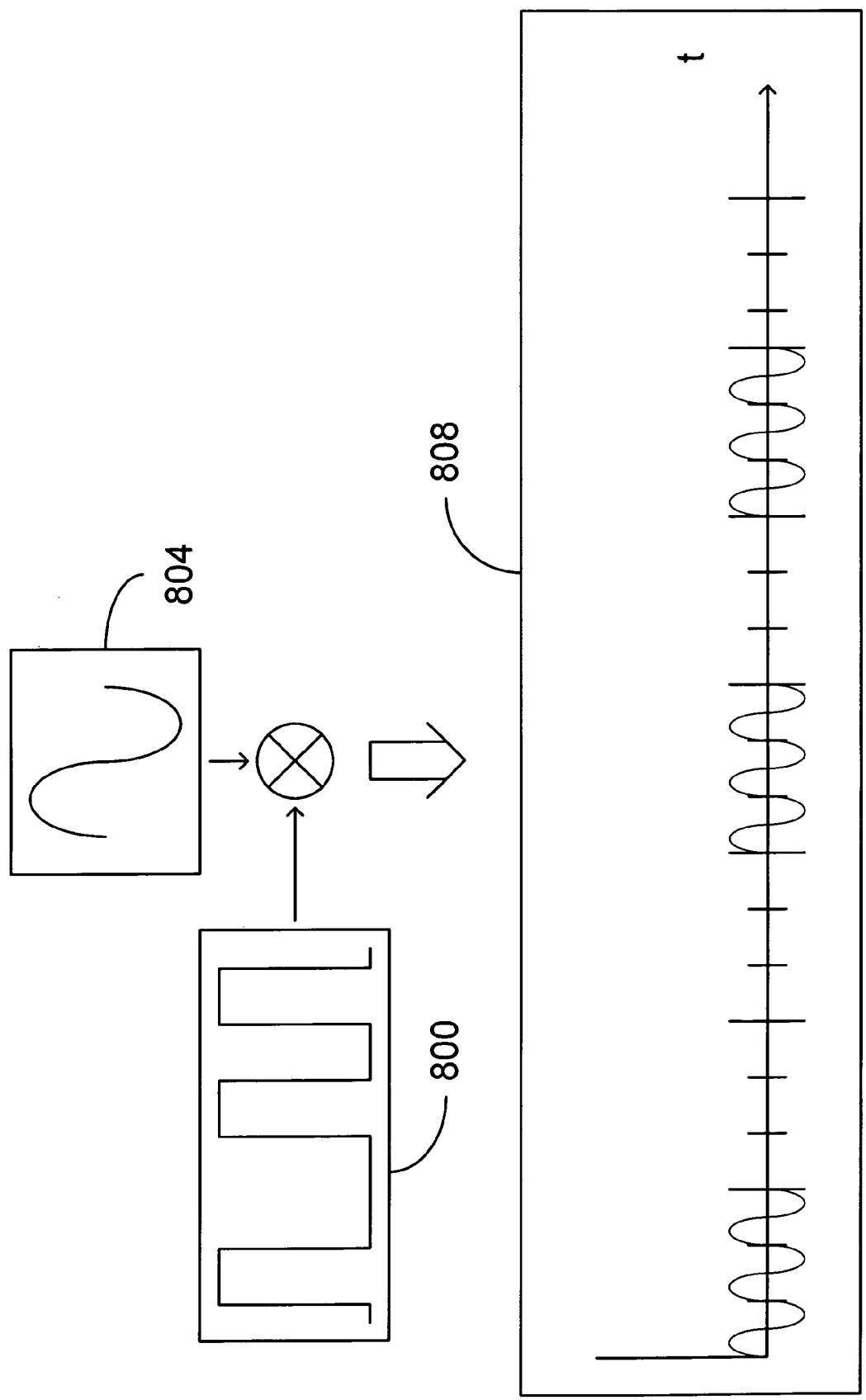
FIG. 8 illustrates a method of modulating a signal so as to produce a train of signals, according to one embodiment of the invention.

FIG. 8 illustrates an example of the transmission scheme discussed above. Namely, in FIG. 8 a digital signal 800 is used to modulate a substantially sinusoidal carrier wave 804. While a substantially sinusoidal carrier wave is used for exemplary purposes, other signals might be useful in some situations. The carrier wave is modulated according to the digital input to produce the sequence of carrier waves shown in graph 808. These signals are transmitted to the receiver from the portable transmitter in FIG. 1, for example. In this example, as compared to FIG. 2, the carrier wave is only transmitted for 3 cycles when a digital "1" is encountered. Each occurrence of a digital "0" in the digital input produces a "silent" period of no transmission of the carrier wave 804.

It should be understood that for purposes of this patent, a carrier wave is considered to be the signal that is transmitted from the transmitter to the receiver for use in communicating a message. In some instances, transmission of a carrier wave will be interrupted for purposes of conveying the message. Furthermore, in some instances, the carrier wave will have the same general shape as the input wave form. Furthermore, for purposes of this patent, it should be understood that a pattern of signals has a beginning signal and an ending signal.

This on/off modulation scheme is beneficial from a power perspective in that it reduces the number of current drawing instances when communicating a digital message. In a pulse width modulated system, the width of a transmission indicates the value as being a "1" or a "0". Thus, pulse width modulation draws current regardless of whether a "1" or a "0" is transmitted. The on/off scheme avoids drawing current for at least one of the signals (i.e., either the 1's or the 0's). FIG. 8 is an example in which no current is used to convey the 0's. As explained below, this scheme can be utilized further by selecting a coding scheme for the digital message that reduces the number of times that the current drawing value occurs in the message (e.g., reducing the occurrence of "1's" to only twice in an 8 bit message so as to convey a predetermined message).

Figure 9:
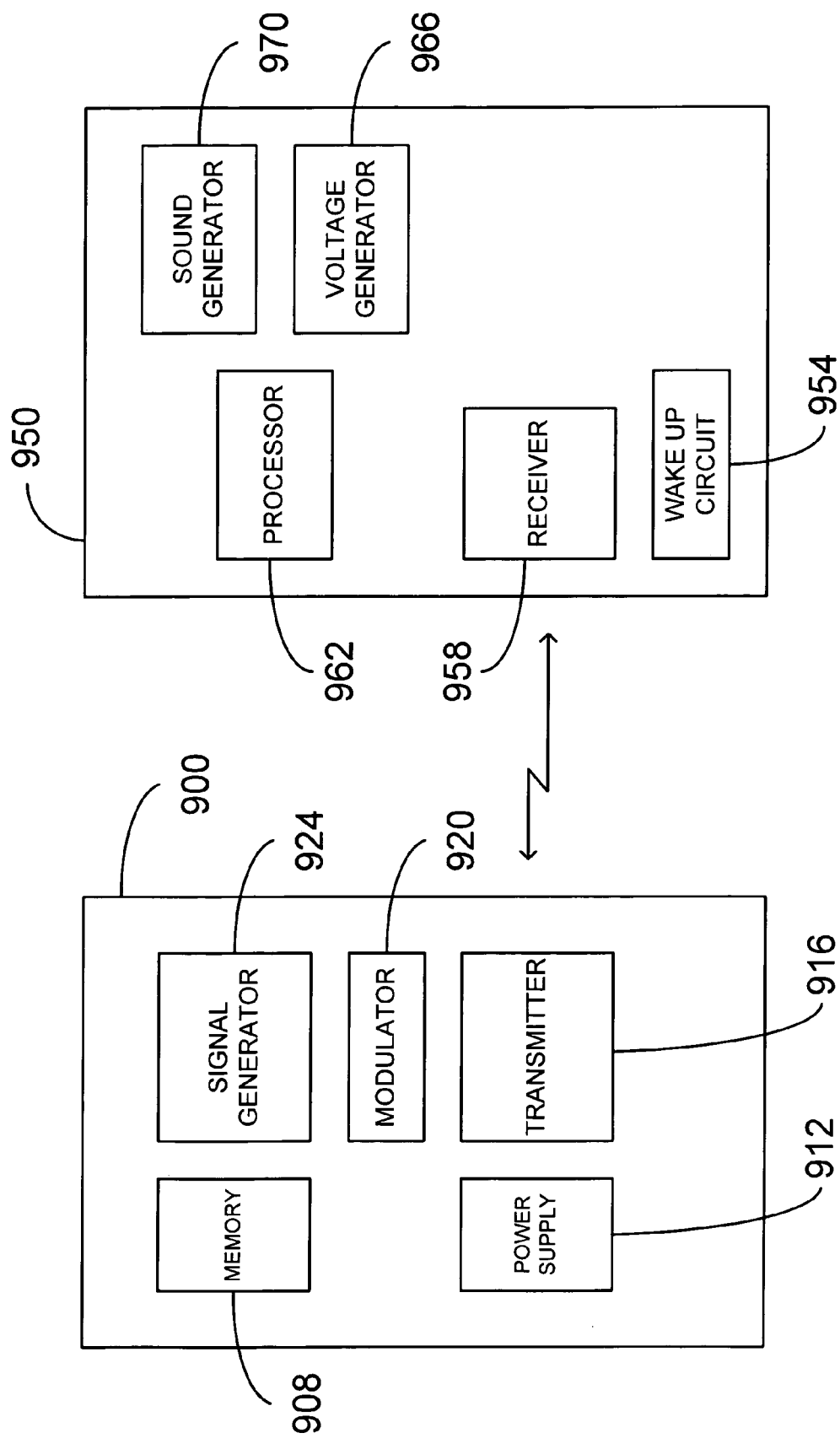
FIG. 9 illustrates a transmitting and receiving system for controlling an animal, according to one embodiment of the invention.

FIG. 9 illustrates a transmitter/receiver system that can be used for implementing the scheme described above. In FIG. 9, a transmitter system 900 is configured to transmit a carrier wave signal, such as that shown in FIG. 8 to receiver system 950. The transmitter 900 is shown as having a memory 908, a power supply 912, a signal generator 924, a modulator 920, and a transmitter 916. These elements can be configured by independent circuits or in some instances with the use of a processor. The memory, for example, could be configured from a series of switches to store the digital message transmitted by the transmitter system 900. Alternatively, the memory could be configured from a processor that has local memory in which the digital message is stored. Alternatively, a separate memory device could be used to store the digital message. The signal generator 924 can be used to generate a substantially sinusoidal signal for modulation by the digital message and transmission to the receiver system 950. The signal generator and memory are coupled with the modulator circuit 920 to allow the digital message to be used to modulate the signal generated by the signal generator. Again, a processor could be used to accomplish the modulation. The modulator could be a separate circuit or integral with the transmitter 916. Thus, the transmitter can be coupled with the memory and the generator so as to transmit the carrier wave in accordance with each occurrence of the first digital signal and so as not to transmit the carrier wave in accordance with each occurrence of the second digital signal in the digital message. The power supply is shown as block 912. The power supply used for the on/off transmission scheme described above can be either battery powered or AC powered. However, it is envisioned that in many instances a battery powered system will provide a great deal of flexibility for the user in placing the transmitter in locations where no AC power is readily available.

The receiver system 950 is shown having a receiver 958, a processor 962, a wake up circuit 954, a sound generator 970 and a stimulation generator 966. The receiver is configured to receive the carrier wave signal sent by the transmitter. As explained above, the digital message embodied by that carrier wave can be used to determine how to control an animal such as one's pet dog or cat. The receiver is coupled with the processor 962 to translate or demodulate the carrier signal. Thus, the processor is configured to determine a digital message from the carrier wave signal wherein reception of the carrier wave corresponds to a first digital signal (e.g., a "1") in the digital message and non-reception of the carrier wave corresponds to a second digital signal (e.g., a "0") in the digital message. The first and second digital signals are opposites of one another (e.g., "1" and "0" or "0" and "1"). FIG. 9 shows alternative correction signal generators that can be used to generate the correction signal sent to the animal. In FIG. 9, a sound generator 970 is shown for generating an audible sound within the hearing range of the animal. The voltage generator 966 can also be used to generate a stimulation signal for the animal. Again, as shown in FIG. 3, the receiver system can be part of a collar assembly 300 for coupling with the animal. A wake up circuit 954 is also shown in FIG. 9. The wake up circuit is a low power circuit that allows the receiver system to sense the presence of an energy signal, such as an RF signal. The wake up circuit can be operated to sense the signal while the remaining circuit elements are run in low power or sleep mode. This allows the receiving system to be operated at low power until needed. Upon sensing a signal, such as the header signal shown in FIG. 2, the remaining circuit elements in receiver system 950 can be invoked as needed.

Figure 6:
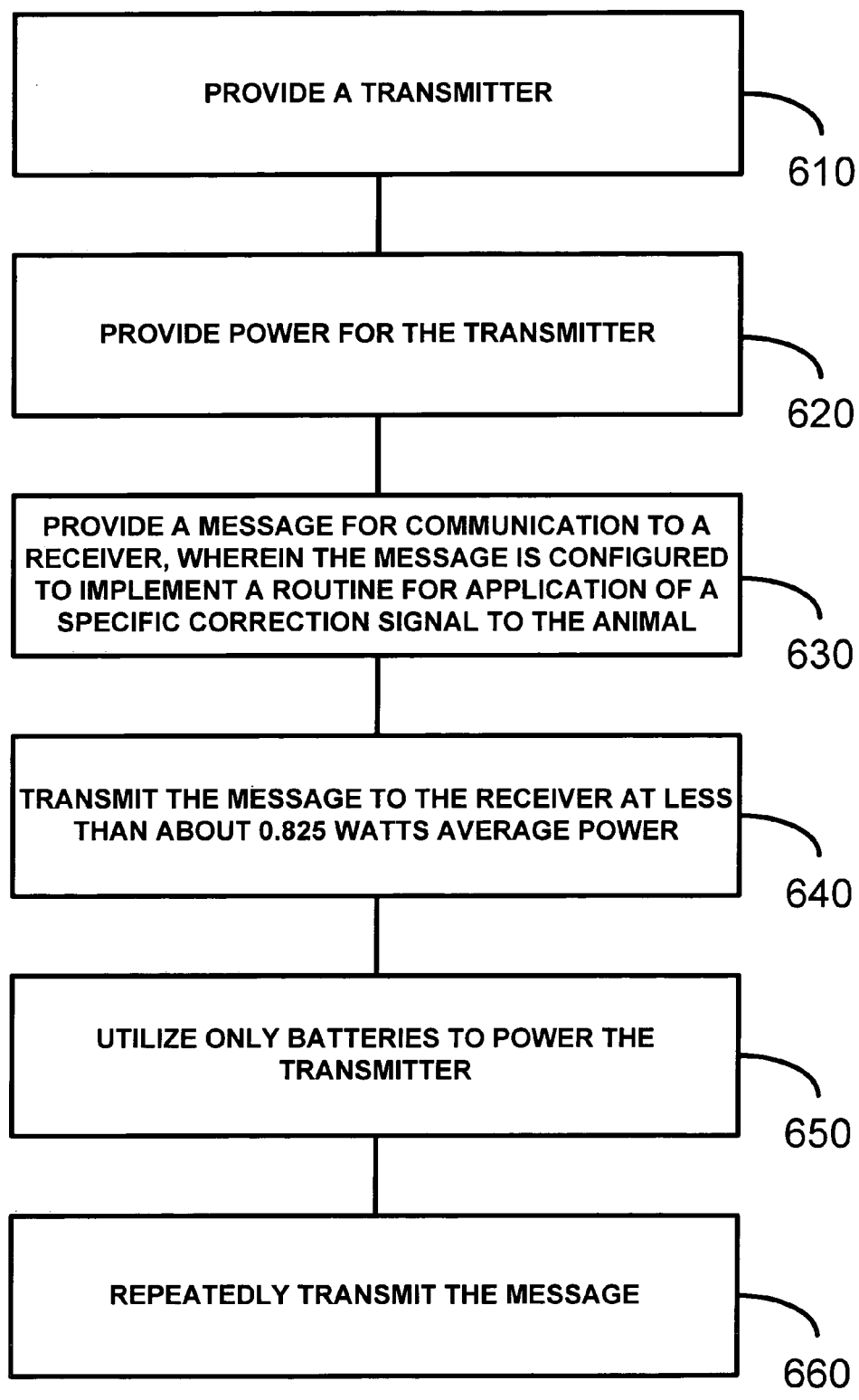
FIG. 6 illustrates a flowchart demonstrating a method of transmitting a low power signal for use in controlling an animal according to one embodiment of the invention.

As noted earlier, the use of a transmitter is limited by the lifetime of the transmitter's power supply. Thus, a highly beneficial transmitter is one that can provide a sufficiently powerful signal so as to be received by the receiver while at the same time enduring for a long period of time without requiring a change of batteries, such as for 3, 4, 5, or 6 months. This allows the transmitter to be portable so that it can be used in locations that do not have AC power readily available. It also allows for the transmitter to be operated for substantially long periods of time without the pet owner having to change the batteries. A method of implementing such a low power transmitter can be seen in flowchart 600 in FIG. 6. According to FIG. 6, a transmitter is provided in block 610 and power is provided for the transmitter in block 620. A message for communication is provided in block 630 for communication to a receiver, wherein the message is configured to implement a routine for application of a specific correction signal to the animal. In block 640, the message is transmitted at about 0.0167 Watts average power. According to another embodiment, the message could be transmitted at 0.00333 Watts average power. According to yet another embodiment of the invention, the message could be transmitted at 0.00167 Watts average power; thus, allowing the transmitter to be operated with 3 "AA" cell batteries. As shown in block 660, the message can be repeatedly transmitted to the receiver.

To implement such a low power system, the signaling format shown in FIG. 2 can be used according to the transmission scheme described in FIGS. 4a and 4b. Similarly, the transmitter system 900 in FIG. 9 can be used to transmit the low power system signal. For example, a payload signal sent according to the formatting of FIG. 2 can be sent where the payload signal comprises only 2 digital "1" values and 6 digital "0" values. This allows 21 distinct messages to be sent with an 8 bit message. Furthermore, as shown in FIG. 2, the transmitter can be configured to only transmit the carrier wave for occurrences of digital "1's" wherein each digital one causes the carrier wave to be transmitted for 8 cycles each of the carrier wave at 6.25 KHz. For this example, an average power is measured to be only 0.00165 Watts or 370 microamps at 4.5 V. This is a significant improvement over the power needed by some AC powered pulse width modulated devices, such as the IFA-12 which at maximum output requires approximately 115 mA at 14.3 V which is 1.65 Watts. As can be seen, the average power for the AC unit is 1000 times that of this embodiment of the invention.

A receiver can be used to detect the digital message sent by the transmitter in a unique fashion. This is illustrated, for example, by flowchart 700 in FIGS. 7a and 7b. In block 710, a receiver is configured to receive a signal having a predetermined frequency. For example, for a carrier wave being transmitted at 6.25 KHz, the predetermined frequency would be 6.25 KHz. To conserve power, the receiver can be configured with a wake up detector circuit to sense the presence of an RF signal for example. The wake up signal can be that shown in FIG. 2 for example—a series of cycles of the carrier wave for 16 cycles followed by 8 cycles of no transmission of the signal.

To determine that the transmission that is being received is of the predetermined frequency, the receiver can apply a unique method to calculate the frequency. Namely, the receiver can sample the received signal according to the following formula:

$$\text{Peak\_Sig} = (a0° - a180°)^2 + (a90° - a270°)^2 \text{ wherein "}a\text{"}$$
is the value of the signal at each expected phase position.

By sampling the signal at every 90 degree location for an expected frequency, two successive cycles of the received waveform should have the same Peak_Sig value. If the Peak_Sig values for the successive cycles do not have the same value, then one can determine that the signal being received is not being transmitted at the predetermined frequency.

Alternatively, one could configure the system to wake up if any signal is received. Thus, one could wait until the payload signal was received before determining whether the payload signal was being transmitted at the predetermined frequency.

Thus, as shown in block 720, the receiver can detect not only the presence of a signal but can also make a determination that the signal that is being received is of the predetermined frequency that the receiver is configured for. If the signal is detected to be of the predetermined frequency, then the receiving circuit elements can be initiated to receive the transmission packet message. This can be implemented according to one embodiment of the invention by taking a first set of samples of the signal at multiple intervals during a first time period corresponding to at least one cycle at the predetermined frequency, as shown in block 730. Then, this first set of samples can be used to calculate a characteristic of the signal for the first cycle, as shown in block 740. Then, a second set of samples of the signal can be taken at multiple intervals during a subsequent time period corresponding to at least one cycle at the frequency, as shown in block 750. In block 755, the second set of samples is utilized to calculate the characteristic of the signal during the second cycle, for example. The calculated, characteristic of the first time period (e.g., cycle #1) can be compared with the calculated characteristic of the subsequent time period (e.g., cycle #2) so as to determine whether the first cycle and the second cycle of the signal have the same value and thus were sent at the predetermined frequency, as shown in block 760. If so, the digital message embodied in the transmission packet can be determined from the signal, as shown in block 770. Once the digital message is determined, it can be used to trigger application of the correction signal that is transmitted to the animal, as shown in block 780.

As shown in block 790, one such characteristic that can be determined is the Peak_Sig according to the formula shown above. The Peak_Sig can then be computed for each of the 8 cycles per bit, as shown for FIG. 2. Thus, if desired, this allows a processor to compare the Peak_Sig value for each cycle. However, one could even choose to skip a cycle, rather than calculating Peak_Sig for every cycle. If the Peak_Sig values for the 8 cycles match, then they confirm that the signal is being transmitted at the predetermined frequency—i.e., at 6.25 KHz according to this example. Furthermore, if the transmitter/receiver scheme utilizes the coding system that only two of the 8 bits will be a digital "1" and only "1's" will cause a carrier wave to be transmitted, then the receiver can determine that the received signal corresponds to a digital "1". Similarly, the Peak_Sig can be applied to the time interval associated with the second most significant bit in FIG. 2. If no signal is received during this time interval, then the receiver will associate the lack of reception of a signal with a digital "0" under this example. It should be noted that the transmission scheme could be reversed so that the receiver recognized "no-reception of the carrier wave" as a "1" instead of a "0" and "reception of the carrier wave" as a "0" instead of a "1".

Figure 7A:
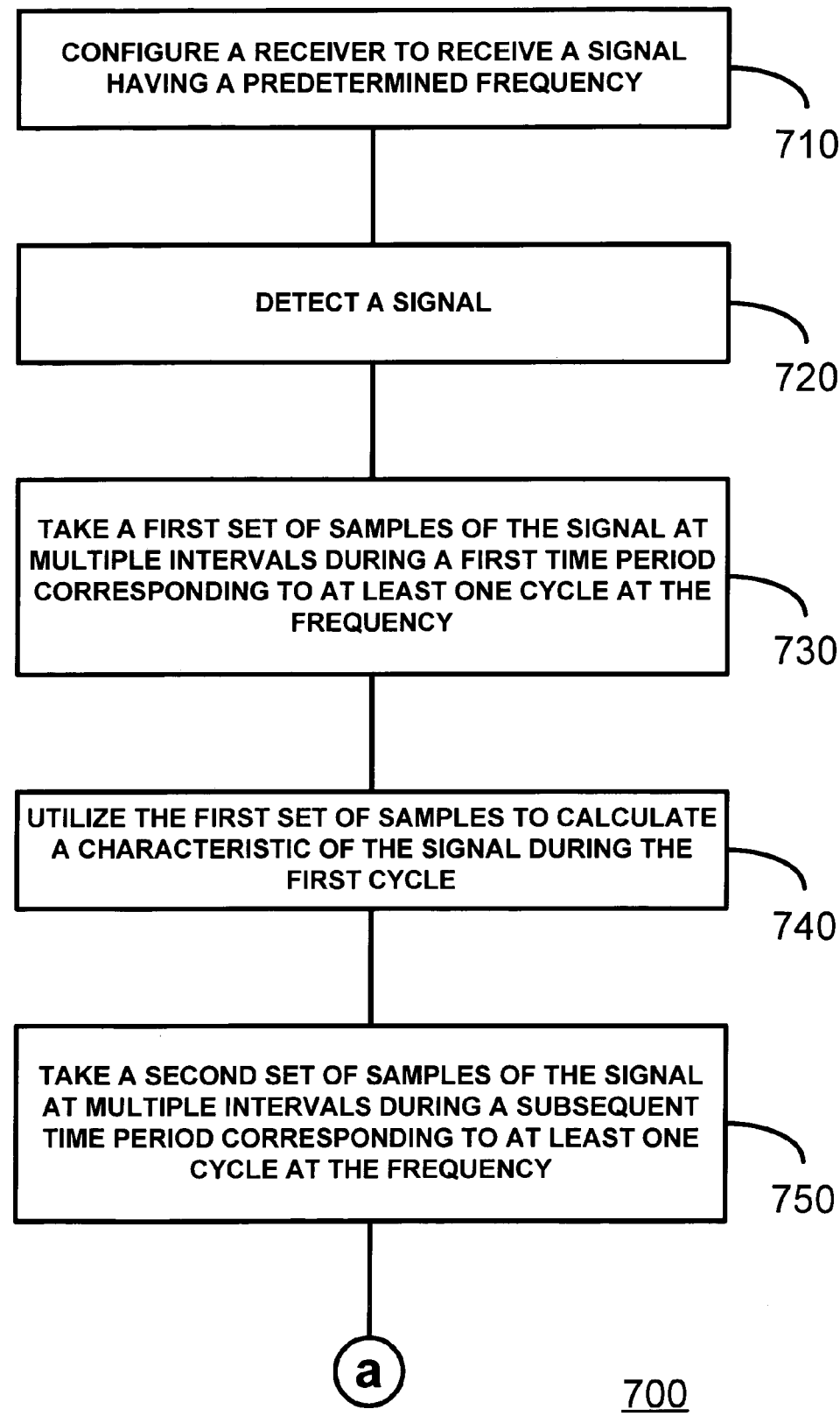
FIGS. 7A and 7B illustrate a flowchart demonstrating a method of receiving a signal for use in controlling an animal, according to one embodiment of the invention.
Figure 7B:
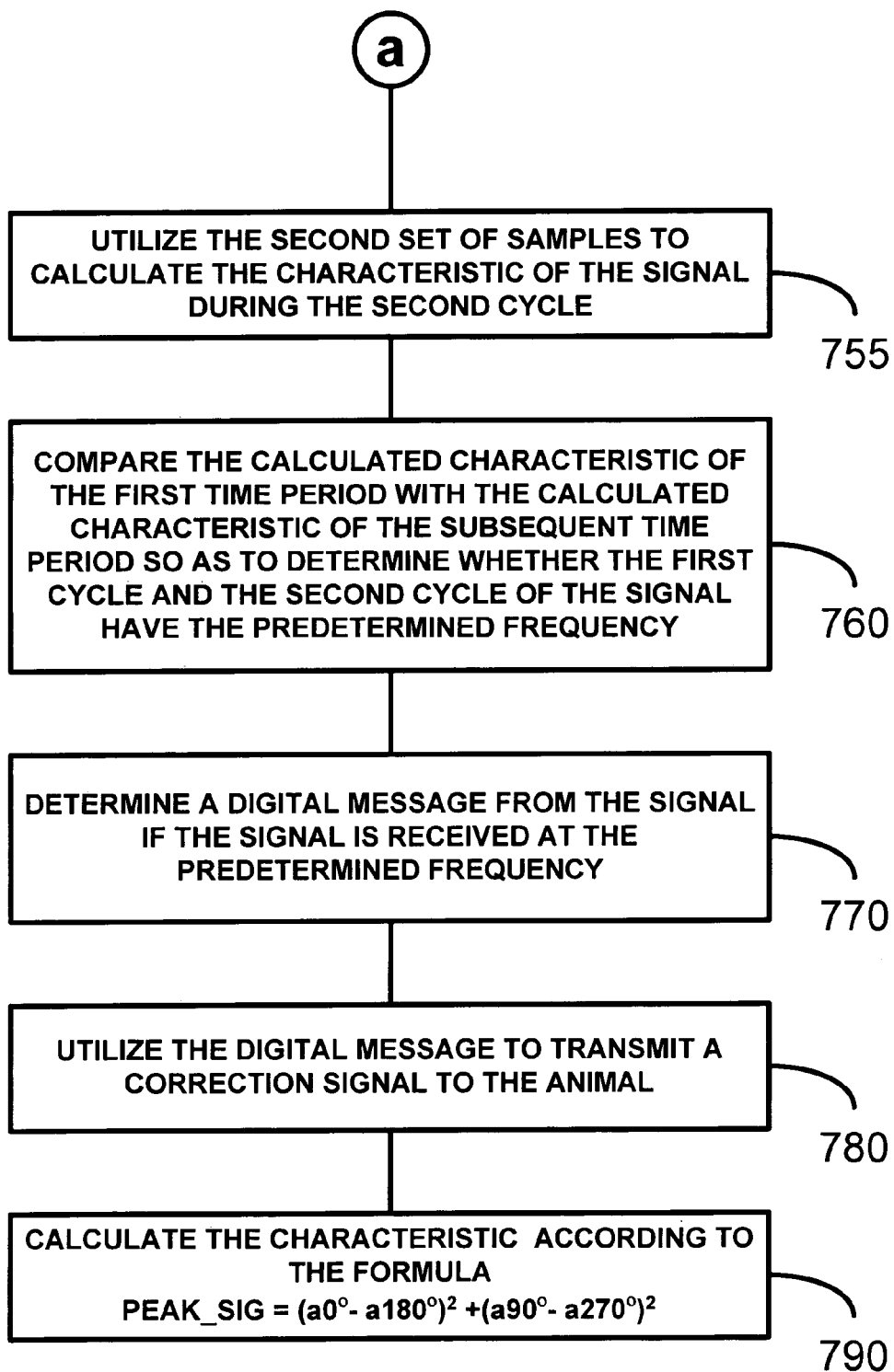

To implement the method of FIGS. 7a and 7b, the receiver shown in FIG. 9 could again be used. The receiver could be configured to receive the signal having the predetermined frequency, such as 6.25 KHz. Furthermore, the processor 962 could be configured to take the first set of samples with the receiver at multiple intervals during the first time period corresponding to at least one cycle at the frequency. The processor could be configured to calculate the characteristic for the samples, such as by calculating the Peak_Sig value described above. The processor could then repeat this process for a subsequent cycle. Similarly, the processor could be configured to compare the characteristics for the two cycles to see if they are equivalent and indicative that the transmission is at the predetermined frequency. Furthermore, the processor can be configured to determine from the received transmission packet the digital message. From the digital message, the processor can determine whether to transmit a correction signal to the animal. One way to implement this would be to store a digital message in the processor, thus designating that receiver as one that would initiate a correction signal every time the digital message is received. Then, the processor could merely compare the received digital message with the value stored at the processor. If they match, the correction signal can be applied. If they don't match, then the receiver would not apply a correction signal.

The coding scheme used in the example above is beneficial because it reduces the need for power, as well. Namely, the coding scheme provides that for every eight bit packet, only 2 of the bits will be 1's. Thus, 21 codes can be communicated to the receiver by only transmitting for 2 data bits during the payload portion of the signal. As can be appreciated by one of ordinary skill in the art, additional messages beyond the 21 could be provided by lengthening the payload to a number greater than 8 bits, e.g., 16 bits where only two of the bits are "1". By only having to transmit two bits, the power requirements are kept low under this coding scheme, as opposed to a transmission scheme in which more than two bits had to be transmitted on average per 8 bit message or one in which a signal had to be transmitted regardless of whether a "1" or a "0" was being transmitted.

Figure 10A:
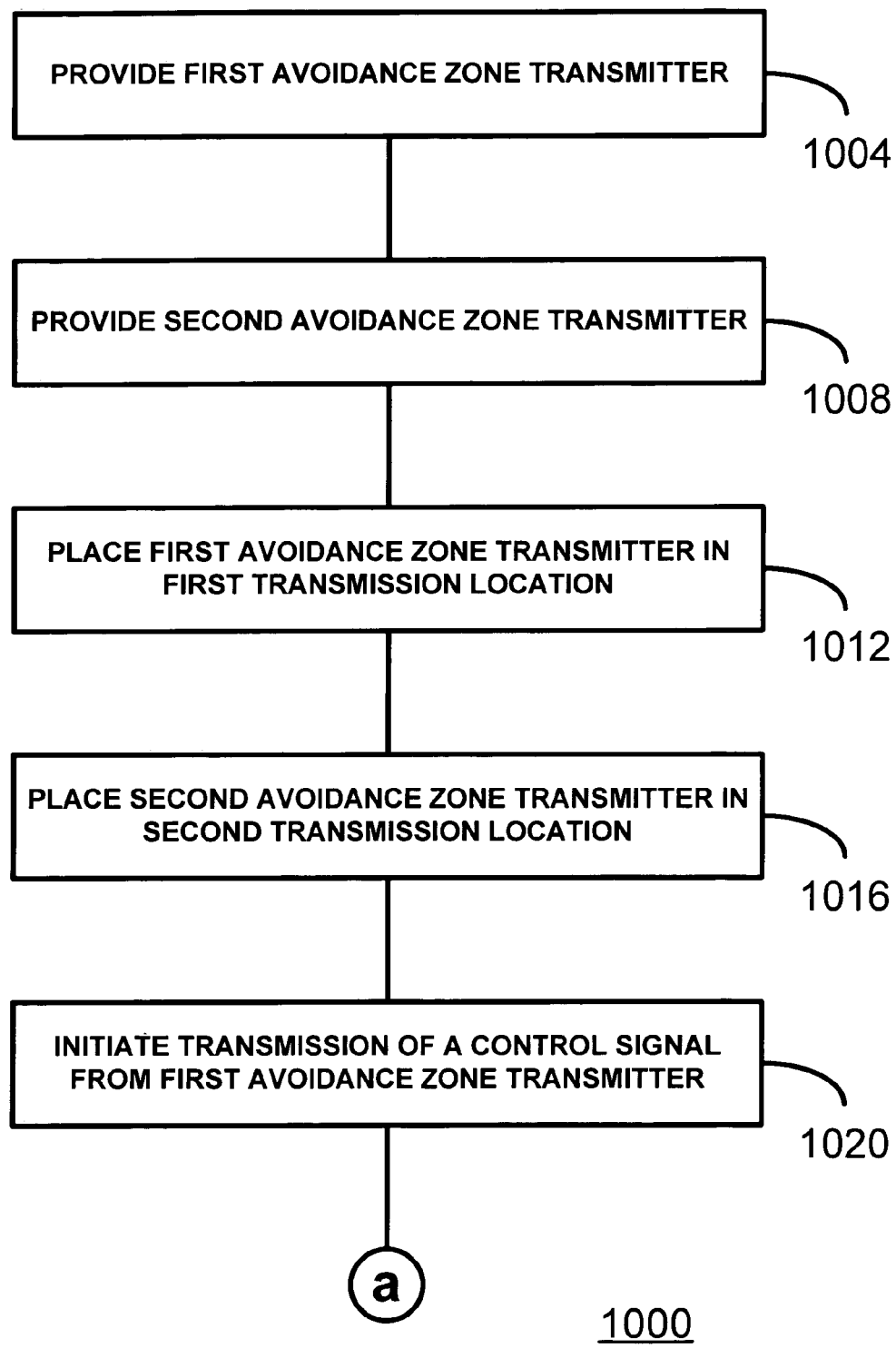
FIGS. 10A and 10B illustrate a flowchart demonstrating a method of combining more than one transmitters to create a zone for controlling a pet, according to one embodiment of the invention.
Figure 10B:
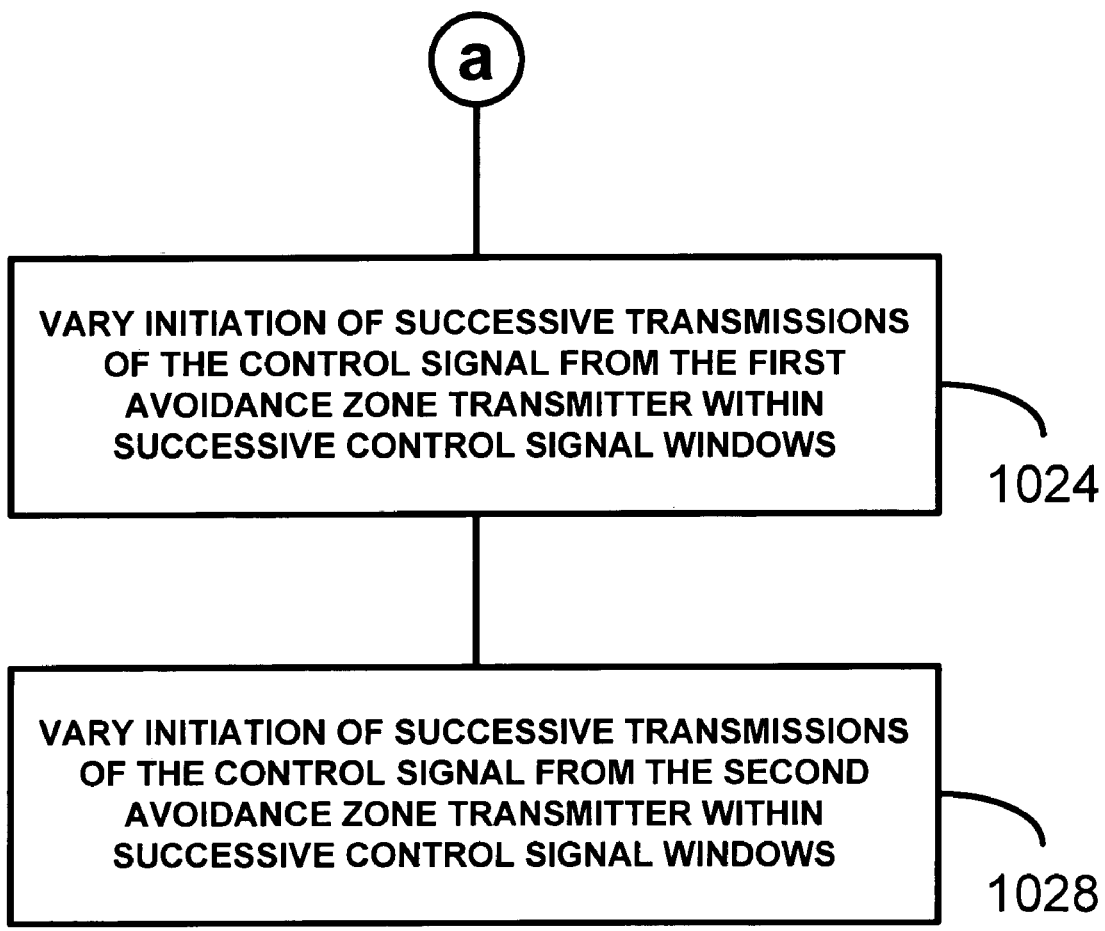

As shown in FIG. 1, one embodiment allows for multiple transmitters to be used in conjunction with one another. This can be accomplished by the method illustrated by flowchart 1000 in FIGS. 10a and 10b. First, one can provide a first avoidance zone transmitter as shown in block 1004. Then, one can provide a second transmitter as shown in block 1008. The transmitter can be placed in their respective locations within a house, for example, as illustrated by blocks 1012 and 1016. Then, a transmission of a control signal can be initiated from the first transmitter as shown in block 1020 as well as from the second transmitter. To keep the two transmitters from interfering with one another, the transmission of their signals can be varied. Thus, as shown by block 1024, the initiation of successive transmissions of the control signal from the first transmitter can be varied within its transmission windows or control signal windows. Similarly, the initiation of the transmission packets sent by the second transmitter can be varied as well within its transmission windows, as shown by block 1028. As a result, there will be less of a likelihood that the two transmitters will transmit the control signal at the same time and create interference for one another. For example, FIG. 1 illustrates that two transmitters can be placed at the opposite ends of a couch to establish a large avoidance zone for the couch—for example to keep a cat off of the couch when the owner is out of the room. The two transmitters can be configured to transmit at varying intervals so that there is less likelihood that the signals from one another would interfere with each other. Thus, instead of only being able to protect part of the couch with one transmitter or ineffectively protect the couch with two transmitters that do not vary their transmission points, the system described above can be used to effectively protect a large area.

Figure 11A:
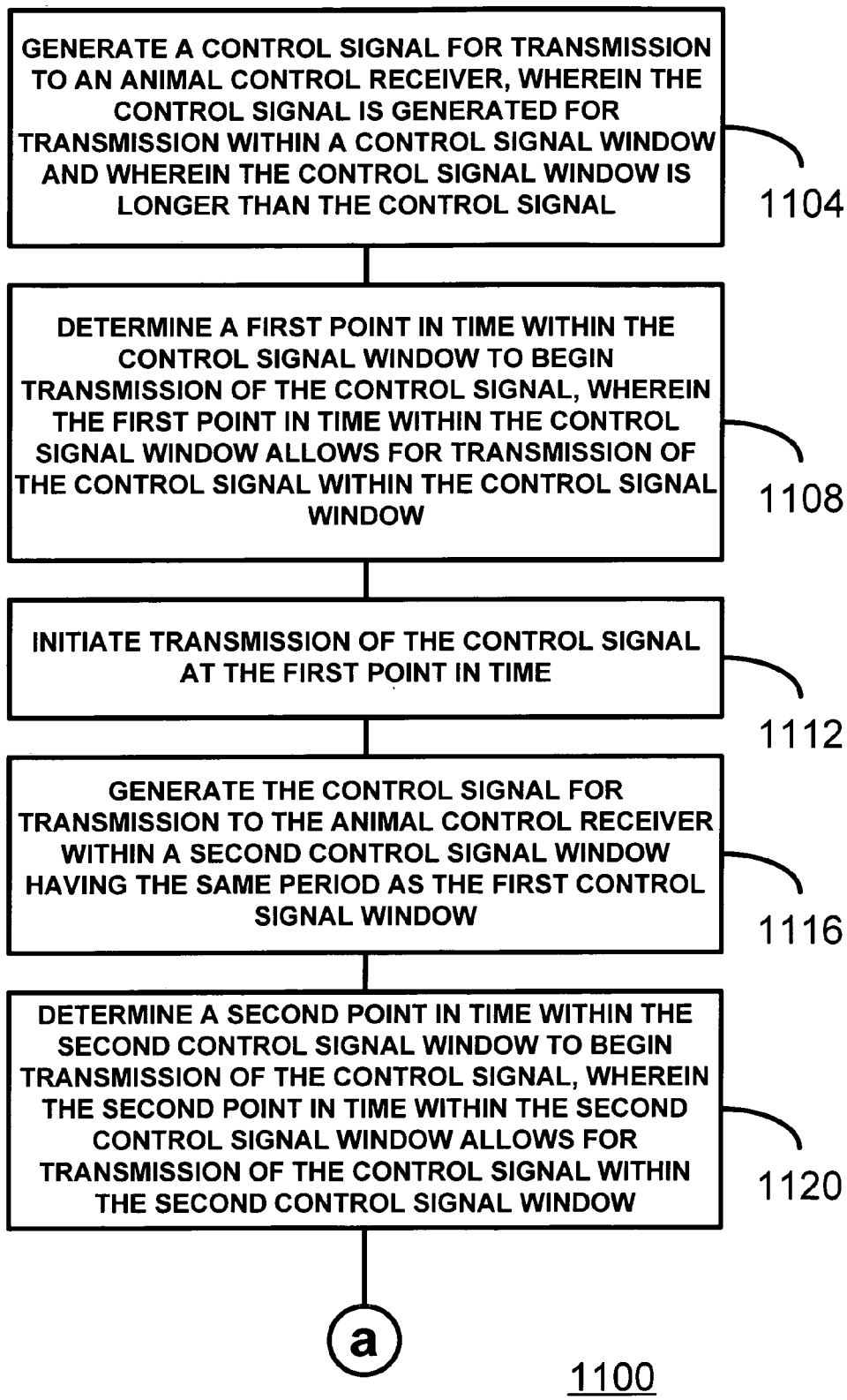
FIGS. 11A and 11B illustrate a flowchart demonstrating a method of altering the initiation of a transmission within a window of time, according to one embodiment of the invention.
Figure 11B:
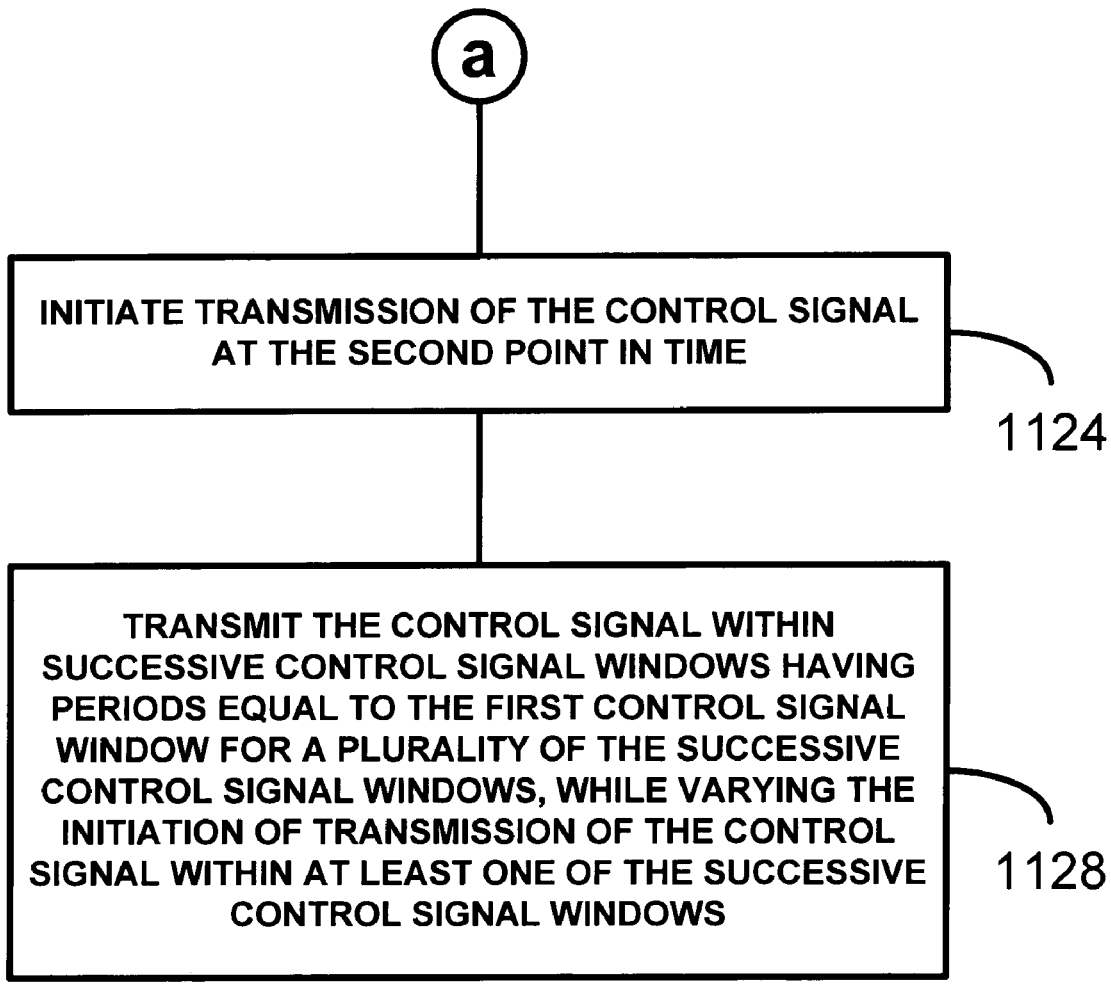
Figure 13:
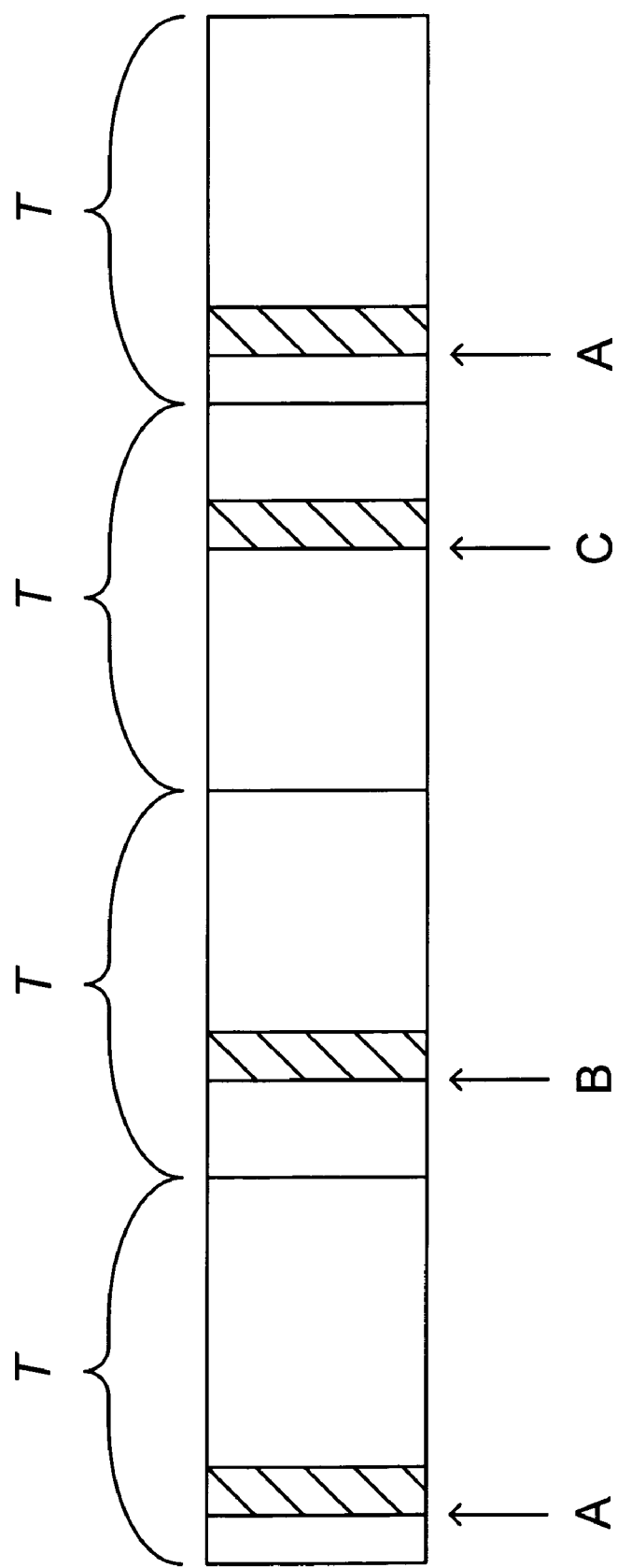
FIG. 13 illustrates a repeated signal shown as occurring at different initiation points within repeated windows of time, according to one embodiment of the invention.

FIGS. 11a and 11b further illustrate the method of varying the time in a sequence of transmission windows. FIG. 13 and FIG. 2 help to illustrate the method of flowchart 1100, as well. FIG. 2 illustrates a wake up signal and data packet that are sent as a transmission packet to a receiver. This transmission packet corresponds to the hatched area within the transmission windows "T" shown in FIG. 13. For a 6.25 KHz carrier signal, for example, the period of the carrier signal is 160 microseconds per cycle. To transmit a transmission packet according the exemplary scheme shown in FIG. 2 would take 88 cycles at 160 microseconds per cycle. Thus, this is equal to 14.08 milliseconds to transmit the entire transmission packet. A transmitter can transmit the transmission packet within successive windows (e.g., transmission windows "T" in FIG. 13) at 300 milliseconds and be very effective. Of course, other time periods could be used as well. Thus, when 300 millisecond windows are used, there is quite a bit of room for varying when to start transmission of the 14.08 millisecond transmission packet. FIG. 13 shows the initiation point varying from window to window from points "A" to "B" to "C" and back to "A"

again. To accomplish this variation, one can use a randomization circuit, such as a processor configured to generate a random number or a separate circuit to generate a randomization factor, and then choose the initiation point (i.e., "A", "B", "C", etc.) within each window. This results in the packet being sent within every window—but, it does not require that the packet be sent at the same initiation point within every window. As a result, this jitter helps prevent two units that are being used in close proximity with one another from interfering with one another—or at least significantly reduces the chance that a frequent interference would occur.

FIGS. 11a and 11b illustrate a transmission scheme according to flowchart 1100. In block 1104, a control signal is generated for transmission to an animal control receiver, wherein the control signal is generated for transmission within a control signal window and wherein the control signal window is longer than the control signal. In block 1108, a first point within the control signal window is determined from which to begin transmission of the control signal. The first point is selected so as to still allow for transmission of the control signal packet within the control signal window. In block 1112, transmission of the control signal at the initiation point is initiated. In block 1116, the control signal is generated for transmission to the animal control receiver within a second control signal window having the same period as the first control signal window. A second point in time or initiation point is determined for the second control signal window from which to begin transmission of the control signal, as shown in block 1120. The second initiation point allows for the transmission of the control signal packet within the second control signal window. Then, the transmission of the control signal can be initiated again starting at the second initiation point, as shown in block 1124. In block 1128, this process can be repeated by transmitting the control signal packet in successive control signal windows of the same period while varying the initiation of transmission of the control signal packet within successive control signal windows.

To implement the variation of the initiation point within control signal windows, one can use a randomization circuit to select successive initiation points. However, in some instances, one might also use a predetermined pattern to accomplish the variation. Thus, for example, a processor might choose to randomize the initiation point for 4 out of 5 transmission windows—but, initiate the transmission for the fifth window at the beginning of the fifth transmission window.

Figure 12A:
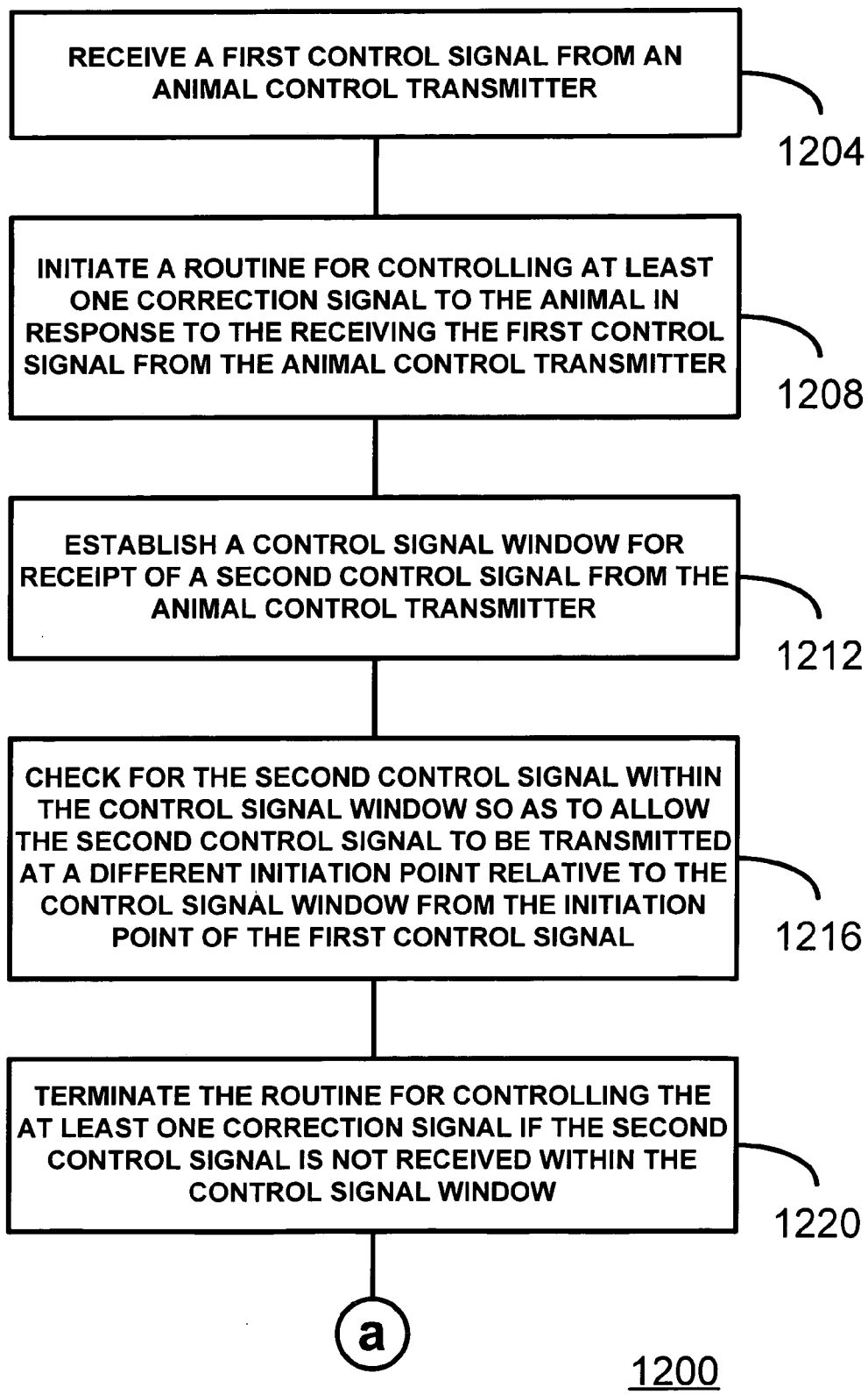
FIGS. 12A and 12B illustrate a flowchart demonstrating a method of receiving a signal occurring at different initiation points within windows of time, according to one embodiment of the invention.
Figure 12B:
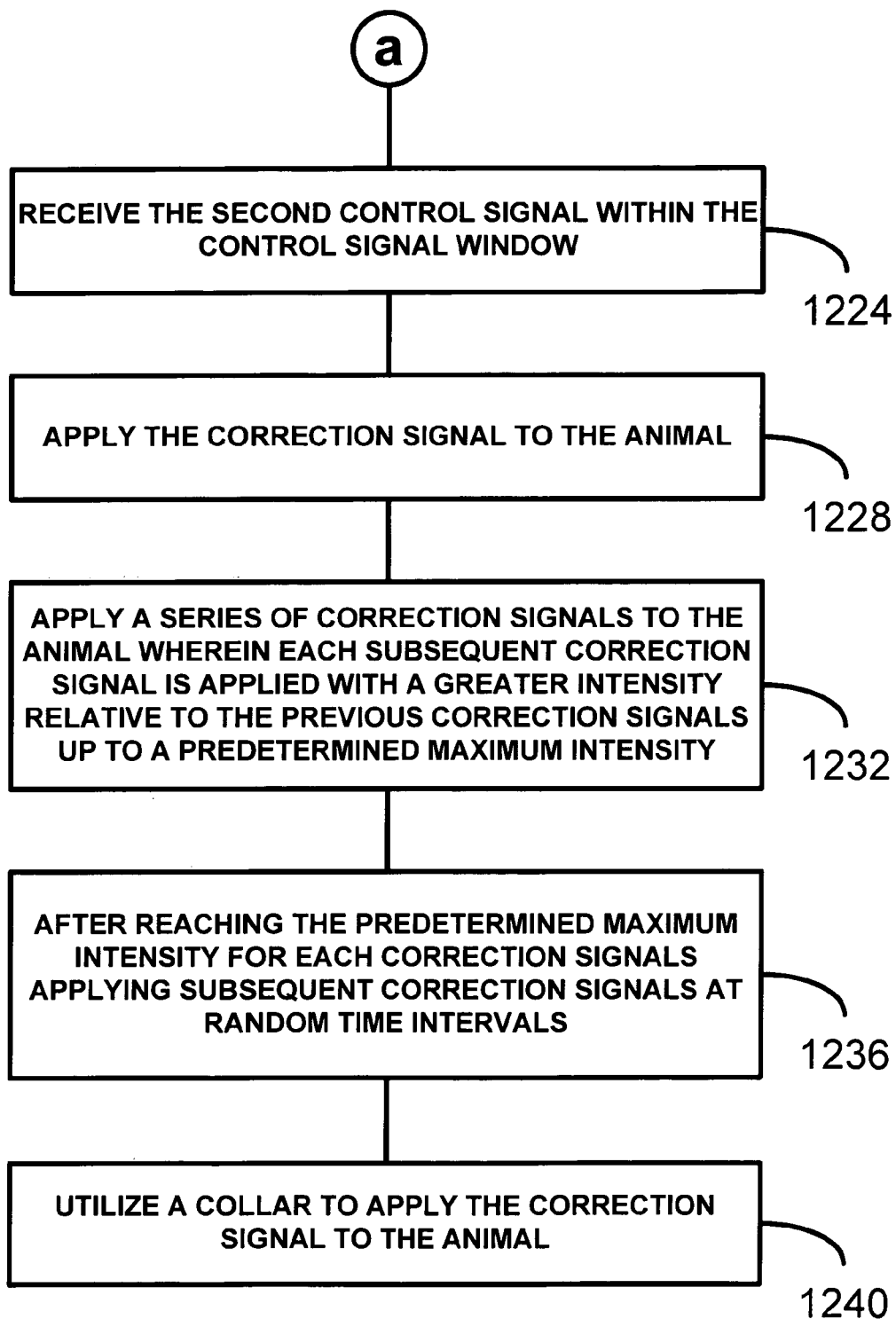

A receiver that receives this "jittered" type of signal can be configured to check for the variation. For example, the flowchart 1200 shown in FIGS. 12a and 12b illustrate one such method. In block 1204 of flowchart 1200, a first control signal is received from an animal control transmitter. A routine is initiated for controlling at least one correction signal to the animal in response to receiving the first control signal from the animal control transmitter, as shown in block 1208. A control signal window can be established for receipt of a second control signal from the animal control transmitter in block 1212. Furthermore, a check can be made for a second control signal within the second control signal window so as to allow the second control signal to be transmitted at a different initiation point in the second control signal window than was used for the initiation point for the control signal in the first control signal window, as shown in block 1216. The receiver can terminate the correction signal routine if the second control signal is not received within the second control signal window, as shown by block 1220. However, if the second control signal is received within the second control signal window, as shown by block 1224, then the routine for applying the correction signal can continue. Thus, in this example, block 1228 illustrates that the correction signal is applied to the animal.

According to one correction signal routine, a series of correction signals can be applied to the animal for every correction signal window in which the control signal packet is received. The initial magnitude of the correction signal that is applied to the animal can be determined in one example by determining the strength of the received signal. Thus, the strength of the signal can be used to indicate the relative location of the animal within the avoidance zone, i.e., a strong signal indicates the animal is closer to the transmitter than would a weak signal. Furthermore, according to the routine shown in block 1232, each subsequent correction signal that is applied to the animal during its time inside the avoidance zone is applied with a greater intensity relative to the previous correction signal—up to a predetermined maximum intensity. After a predetermined time at the maximum intensity, the unit would shut down. Similarly, block 1236 illustrates that after a period of time in which the animal is not removed from the zone, the time intervals between correction signals could be randomized. As noted earlier, a collar assembly can be used to hold the receiver and apply the correction signal in the form of a sound or an electrical stimulation, as shown in block 1240.

Figure 14:
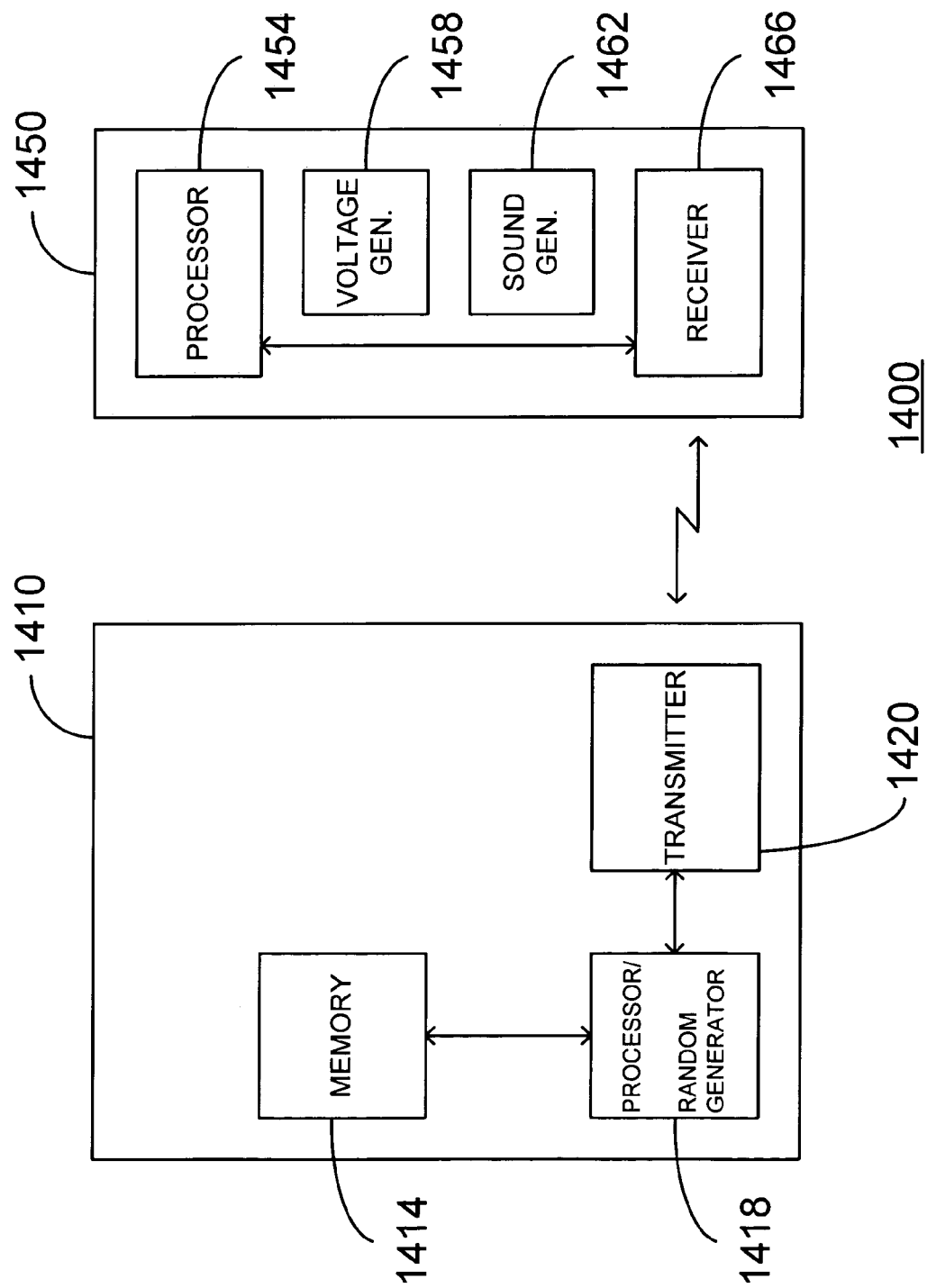
FIG. 14 illustrates a system for transmitting and receiving an animal control signal, according to one embodiment of the invention.

FIG. 14 shows a transmitter/receiver system to implement the method of FIGS. 13a and 13b, according to one embodiment of the invention. Namely, FIG. 14 illustrates a system 1400 of transmission system 1410 and receiving system 1450. The transmission system in this example is shown as having a memory 1414 for storing a control signal for transmission to an animal control receiver. The memory could take a variety of forms. It could be a memory chip programmed with the information. Alternatively, it could be as simple as a series of switches such as BCD switches configured to store an 8 bit message, for example. This would allow the transmission system to be configured to a particular message depending on how the pet owner wanted to use the transmitter—for example, for a cat, a little dog, a big dog, etc. FIG. 14 also shows a transmission initiation circuit for varying the initiation point for transmitting a control signal within a control signal window. In FIG. 14, the processor 1418 can be configured to select and vary the initiation points within successive windows. For example, according to one embodiment, the processor can be configured with a randomization feature. FIG. 14 also shows a transmitter 1420 coupled with the memory and coupled with the processor. The transmitter can be configured to transmit the control signal stored by the memory as part of a transmission packet within successive control signal windows at varying points of initiation within successive control signal windows. As explained above, the processor can be further configured to vary the initiation point by either randomizing the initiation point or applying a predetermined sequence of initiation points.

The receiving system is shown in FIG. 14 as system 1450. It is shown as having a receiver 1466 for receiving the signal from the transmitter. It too is shown having a processor 1454. Furthermore, the example in FIG. 14 is shown with a voltage generator or Supply 1458 and a sound generator 1462. The processor is configured for initiating a routine for controlling at least one correction signal for application to the animal in response to receiving the first control signal from the animal control receiver. For example, this routine could simply be the application of the correction signal every time that the control signal packet is received from the transmitter. Furthermore, the processor is configured for establishing a control signal window for receipt of a second control signal from the animal control transmitter while at the same time allowing the second control signal to be transmitted at a different initiation point within the second control signal window as opposed to the initiation point that was used for the first control signal window. The processor and receiving system can be further configured to implement the routines described in FIGS. 12a and 12b, for example.

Referring to FIG. 2, each 8 bit signal sent in the exemplary signal of FIG. 2 can be associated with a unique pet. For example a digital value of "10100000" can be associated with correcting the pet wearing the animal collar programmed to that code—such as the family cat. Similarly, the digital value of "10010000" can be associated with correcting the pet wearing the animal collar programmed to that code—such as the family dog. Table 1 shows an example of 21 different codes that can be implemented with an 8 bit code when only two of the bits are allowed to be 1 and the two 1's must be separated by a 0. This is a useful coding system for low power transmissions as explained above. Thus, code "0" could be used to control the family cat for which a tone is generated to keep the cat away from avoidance zone 1. Similarly, code "1" could be used to control a small dog for which the correction signal is an appropriate electrical stimulation signal to encourage the dog to stay out of avoidance zone 2. Similarly, code 3" in Table 1 could be used to control a large dog for which the correction signal is used to encourage the large dog to stay out of avoidance zone 3. Thus, by using a system with multiple codes, a transmitter can be set to control a particular animal. This allows the small dog to enter zones 1 and 3—but not zone 2.

TABLE 1

| Code Number | 7 | 6 | 5 | 4 | 3 | 2 | 1 | 0 |
|---|---|---|---|---|---|---|---|---|
| 0 | 1 | 0 | 1 | 0 | 0 | 0 | 0 | 0 |
| 1 | 1 | 0 | 0 | 1 | 0 | 0 | 0 | 0 |
| 2 | 1 | 0 | 0 | 0 | 1 | 0 | 0 | 0 |
| 3 | 1 | 0 | 0 | 0 | 0 | 1 | 0 | 0 |
| 4 | 1 | 0 | 0 | 0 | 0 | 0 | 1 | 0 |
| 5 | 1 | 0 | 0 | 0 | 0 | 0 | 0 | 1 |
| 6 | 0 | 1 | 0 | 1 | 0 | 0 | 0 | 0 |
| 7 | 0 | 1 | 0 | 0 | 1 | 0 | 0 | 0 |
| 8 | 0 | 1 | 0 | 0 | 0 | 1 | 0 | 0 |
| 9 | 0 | 1 | 0 | 0 | 0 | 0 | 1 | 0 |
| 10 | 0 | 1 | 0 | 0 | 0 | 0 | 0 | 1 |
| 11 | 0 | 0 | 1 | 0 | 1 | 0 | 0 | 0 |
| 12 | 0 | 0 | 1 | 0 | 0 | 1 | 0 | 0 |
| 13 | 0 | 0 | 1 | 0 | 0 | 0 | 1 | 0 |
| 14 | 0 | 0 | 1 | 0 | 0 | 0 | 0 | 1 |
| 15 | 0 | 0 | 0 | 1 | 0 | 1 | 0 | 0 |
| 16 | 0 | 0 | 0 | 1 | 0 | 0 | 1 | 0 |
| 17 | 0 | 0 | 0 | 1 | 0 | 0 | 0 | 1 |
| 18 | 0 | 0 | 0 | 0 | 1 | 0 | 1 | 0 |
| 19 | 0 | 0 | 0 | 0 | 1 | 0 | 0 | 1 |
| 20 | 0 | 0 | 0 | 0 | 0 | 1 | 0 | 1 |

Figure 15:
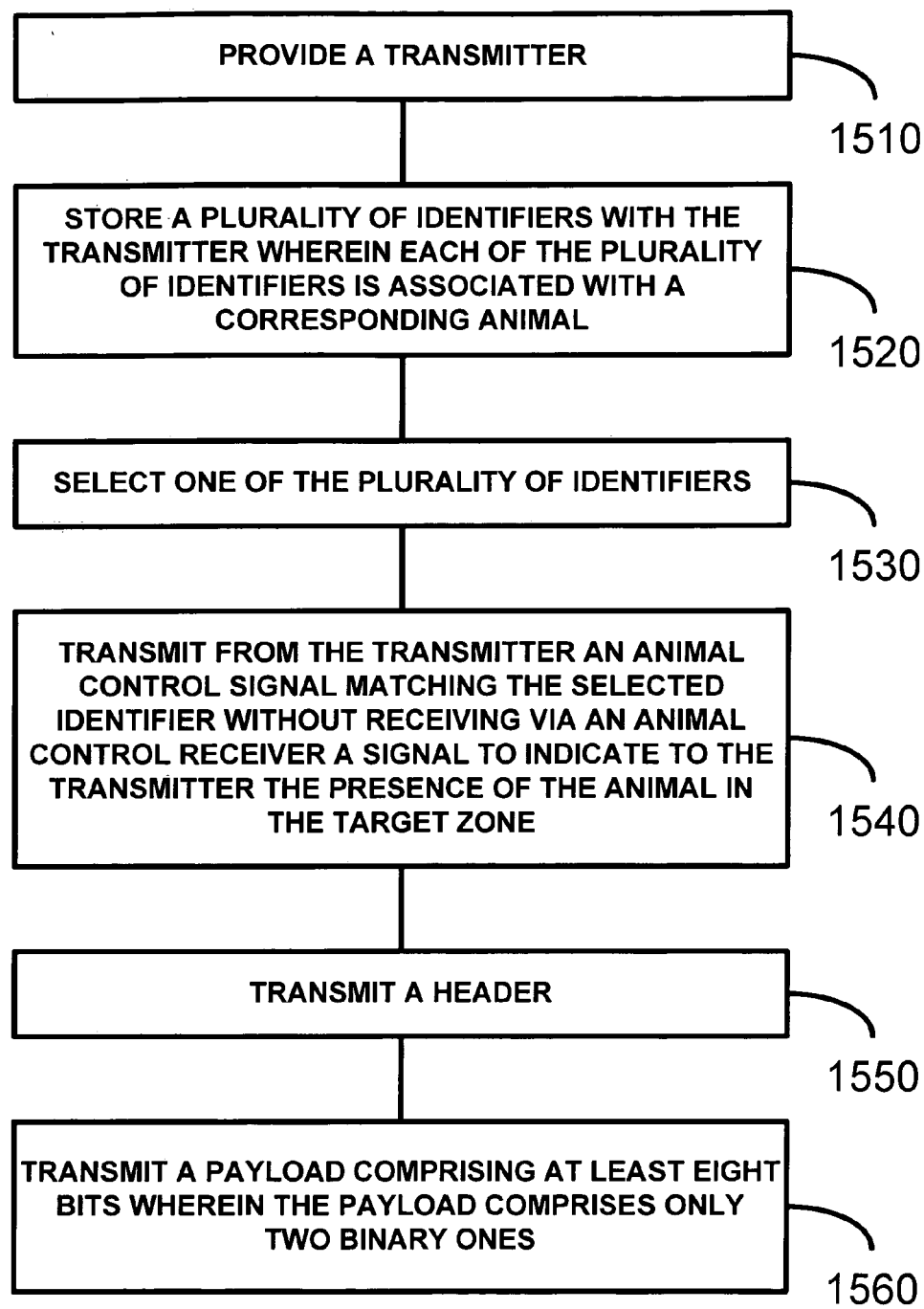
FIG. 15 illustrates a flowchart demonstrating a method of utilizing multiple animal identifiers, according to one embodiment of the invention.

FIG. 15 illustrates a flowchart 1500 for implementing a method of establishing different zones that can be used to control different pets. In block 1510, a transmitter is provided. In block 1520, multiple identifiers are stored with the transmitter wherein each of the identifiers is associated with a different animal. Alternatively, just one identifier can be stored at the transmitter or a series of switches can be provided to allow the transmitter to be set to the appropriate code in Table 1, for example, as the user desires, as shown in block 1530. The transmitter can then transmit the animal control signal which matches the selected identifier as shown in block 1540. The system is simple in that it does not require that a signal be received from the animal indicating that the animal is present within the zone. Rather, it identifies the animal through its code so that a specific avoidance zone can be set for that animal without keeping other animals from that zone. One example of transmitting the signal is to transmit a header, such as a wake up signal, as shown in block 1550 and also transmit a payload which comprises the control signal, such as an 8 bit code having only two digital "1's", as shown in block 1560.

Figure 16:
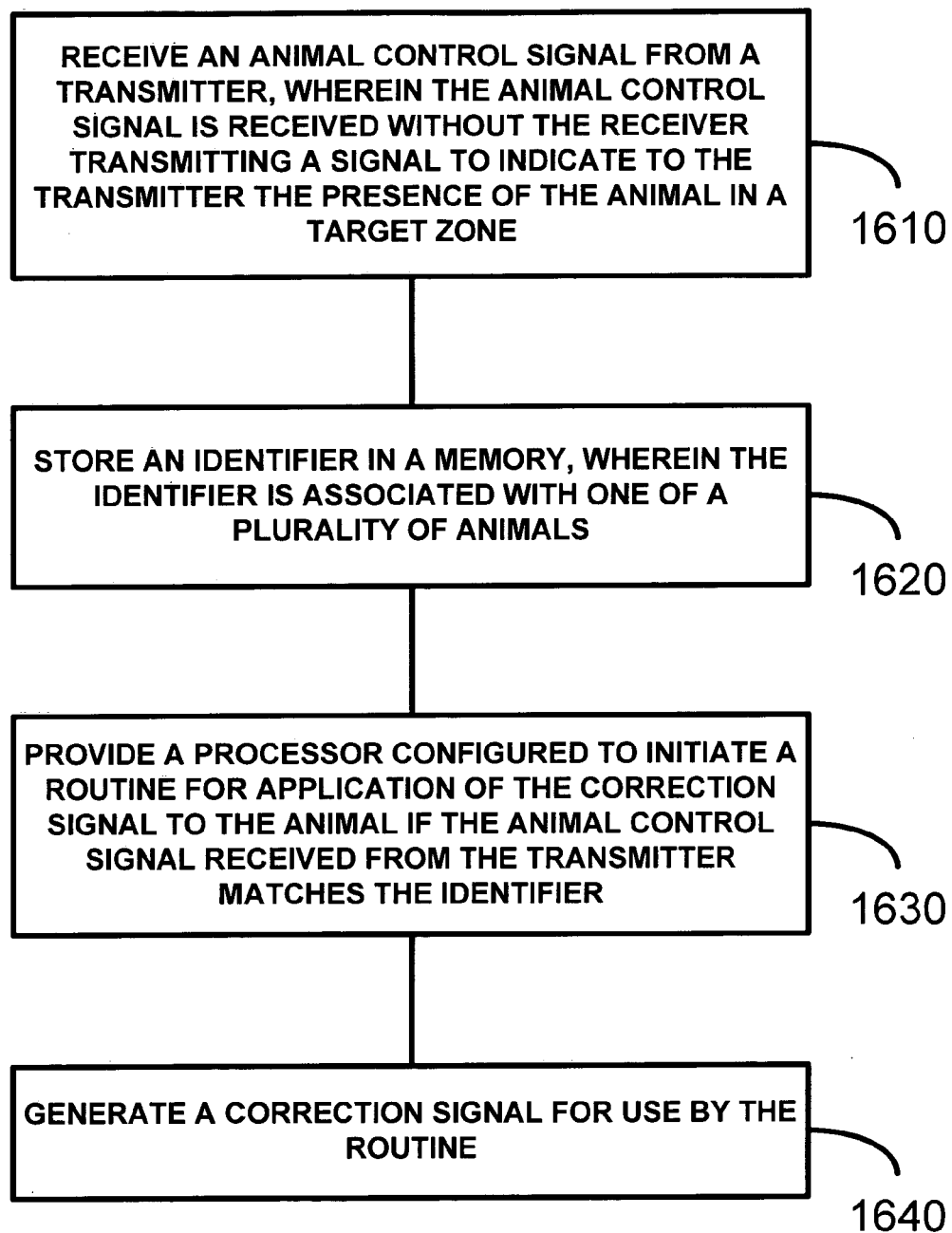
FIG. 16 illustrates a flowchart demonstrating a method of receiving an animal control signal identifying one of many correction signals for application to the animal, according to one embodiment of the invention.

The receiving method can be implemented according to the example shown in FIG. 16 and flowchart 1600. In block 1610 a receiver receives an animal control signal from a transmitter. The animal control signal is received without the receiver transmitting a signal to indicate to the transmitter the presence of the animal in an avoidance (or target) zone, as shown in block 1610. The receiver can be configured to store an identifier in its memory as shown in block 1620. The identifier is used to identify the animal as one of many animals in a household, for example. A processor is provided to and configured to initiate a routine for application of the correction signal to the animal if the animal control signal received from the transmitter matches the identifier, as shown in block 1630. Furthermore, a correction signal can be generated for use by the correction routine, in block 1640.

Figure 17:
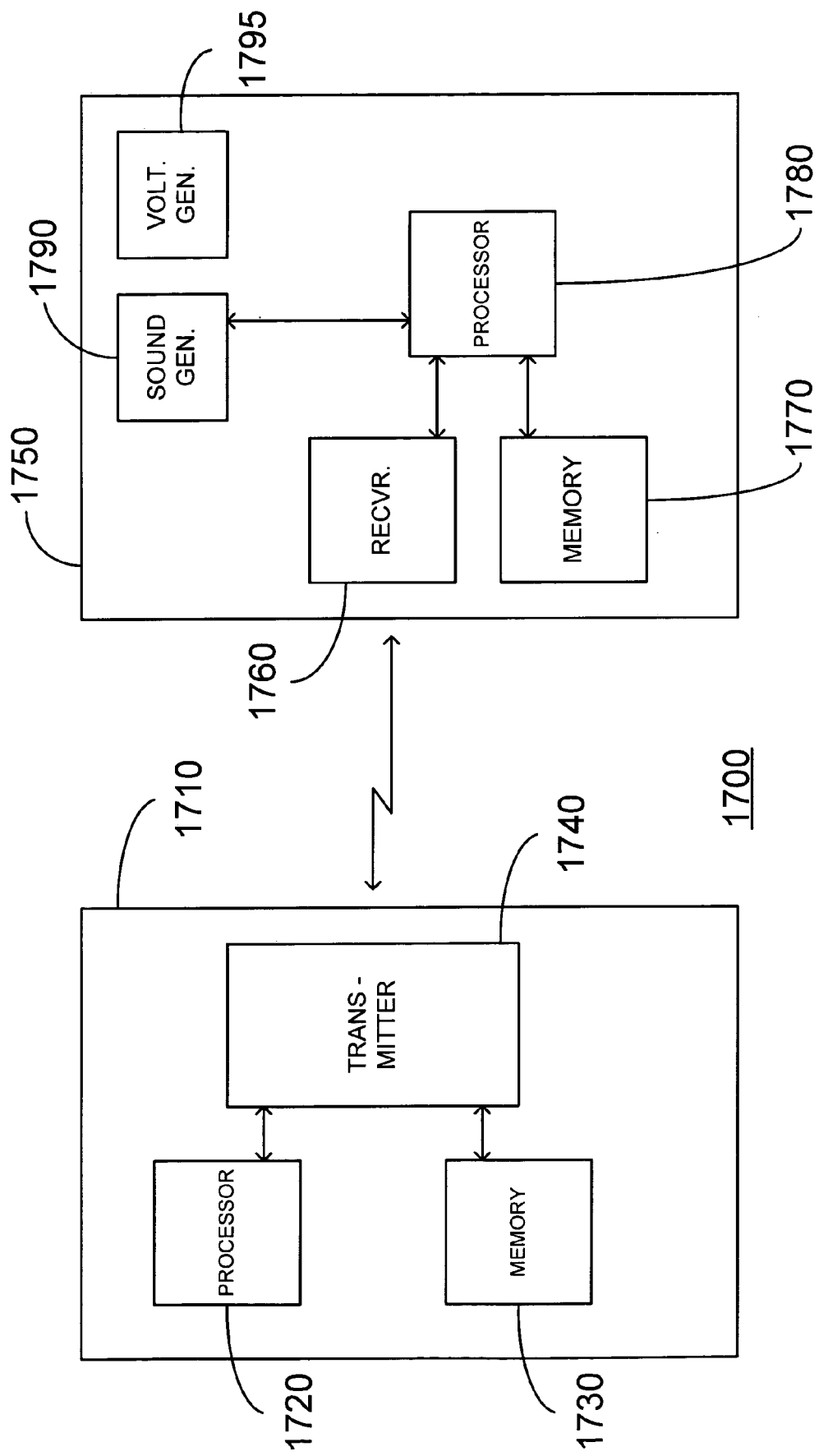
FIG. 17 illustrates a system for transmitting and receiving animal control signals, according to one embodiment of the invention.

FIG. 17 illustrates a system for implementing the method described in FIGS. 15 and 16. Namely, FIG. 17 shows system 1700 having a transmission system 1710. The example shows a processor 1720 coupled with memory 1730 and transmitter circuit 1740. The memory can be a memory chip or a series of switches capable of being configured to store a message. Similarly, the processor can be configured to implement the transmission method illustrated in FIG. 15. The receiver system 1750 is shown as having receiver 1760 and memory 1770 as well as processor 1780 and correction signal generators 1790 and 1795. Again, the memory can take a form similar to that described for the transmitter. Also, the processor can essentially be configured to implement the method described in FIG. 16.

In some cases, an animal might acclimate to regular, periodic stimulation when the animal enters an avoidance zone. Thus, the animal will linger in the avoidance zone rather than be discouraged from being present in the avoidance zone. This might be especially true for stubborn animals. To solve this problem, a random stimulation pattern can be used. The random stimulation can be more annoying to the animal than the regular, periodic stimulation, thus encouraging the animal to vacate the zone.

Figure 20:
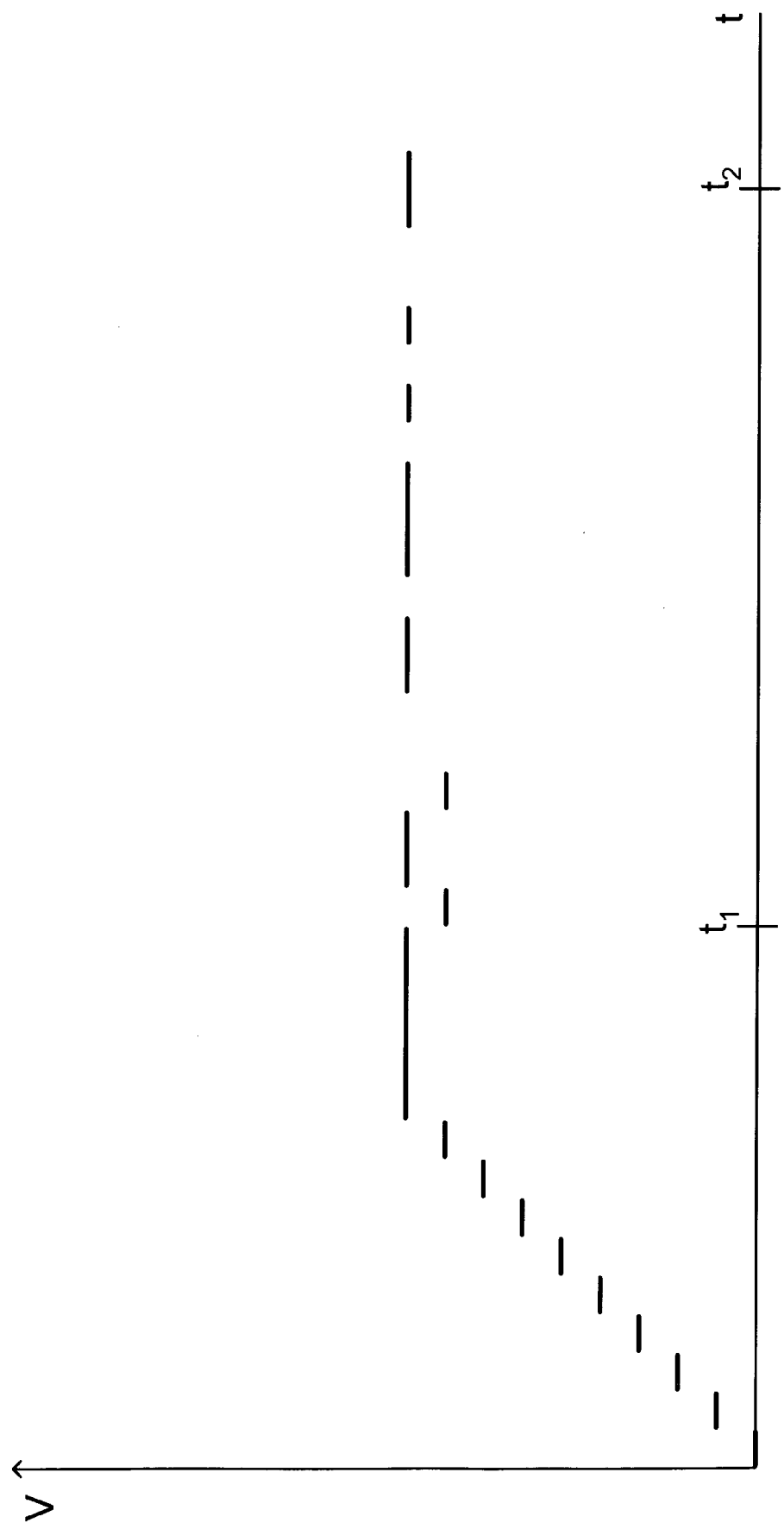
FIG. 20 illustrates a graph of a correction signal that can be applied to an animal according to one embodiment of the invention.

For example, FIG. 20 illustrates an example of the randomization principle. In FIG. 20 a series of control signals are transmitted and received by the receiver. Over a period of time the receiver increases the stimulation up to a predetermined maximum. This is shown by the ramping up and leveling off of the signal in FIG. 20. After time "t1" measured from when the first correction signal in the sequence was first applied, the collar assembly worn by the animal can randomize the correction signal. FIG. 20 shows a variety of ways in which the randomization can be implemented. For example, it can be implemented as different time intervals between correction signals, differing magnitudes of the correction signal, and different lengths of the correction signal. Of course, at time "t2" the receiver will cease any stimulation in case the animal is caught in the avoidance zone.

Figure 21:
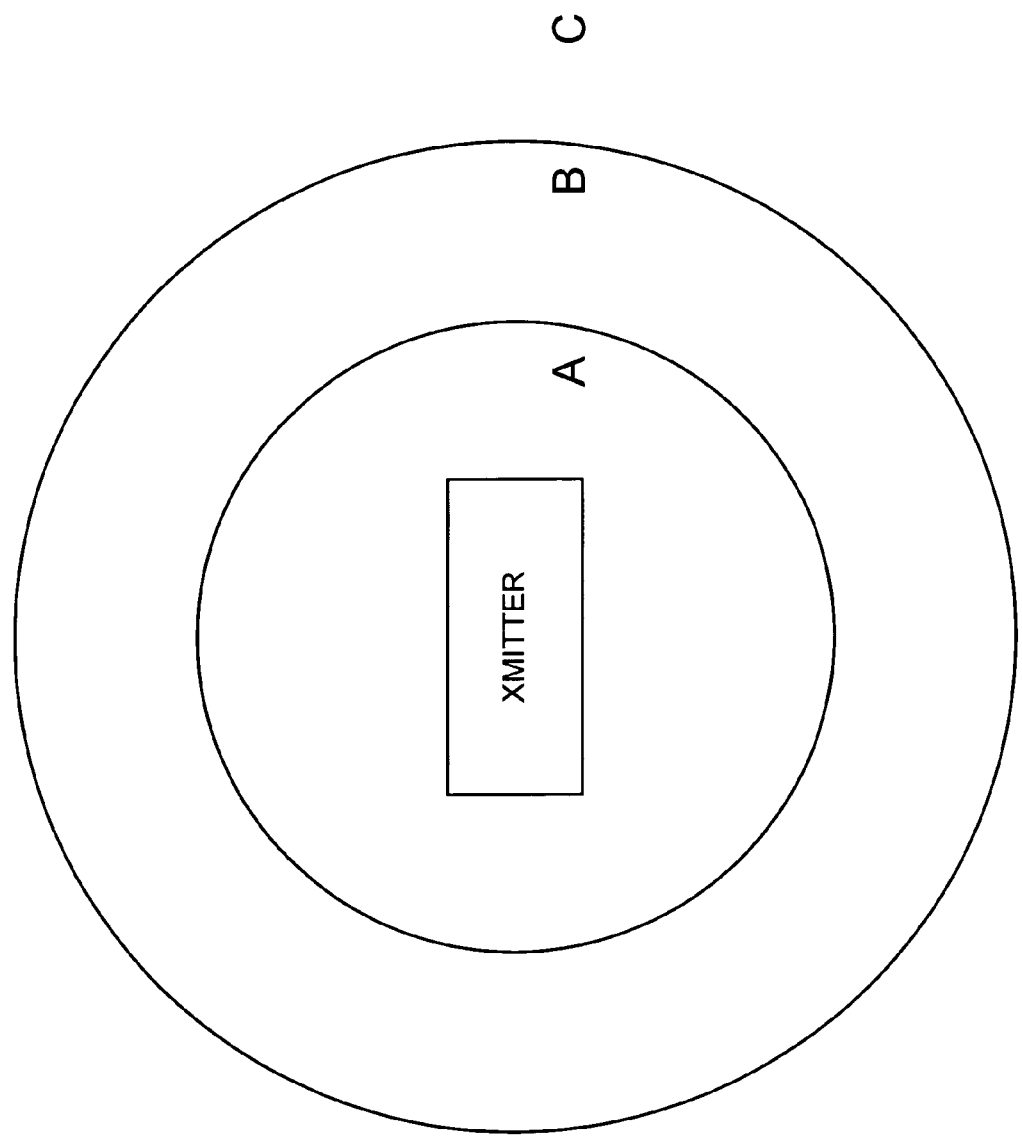
FIG. 21 illustrates how avoidance zones can be established around a transmitter, according to one embodiment of the invention.

FIG. 21 illustrates that the magnitude of the initial correction signal can vary depending on the strength of the received signal at the receiver. For example, FIG. 21 shows an avoidance zone covering areas A and B. The area C is outside the avoidance zone. If the animal enters the avoidance zone quickly so as to end up in area A before a correction signal can be sent, the receiver can use a higher magnitude correction signal. On the other hand, if the animal is just inside area B, the signal received by the receiver will be of lower strength. The receiver can recognize this fact and use a correction signal of lower magnitude.

Figure 18A:
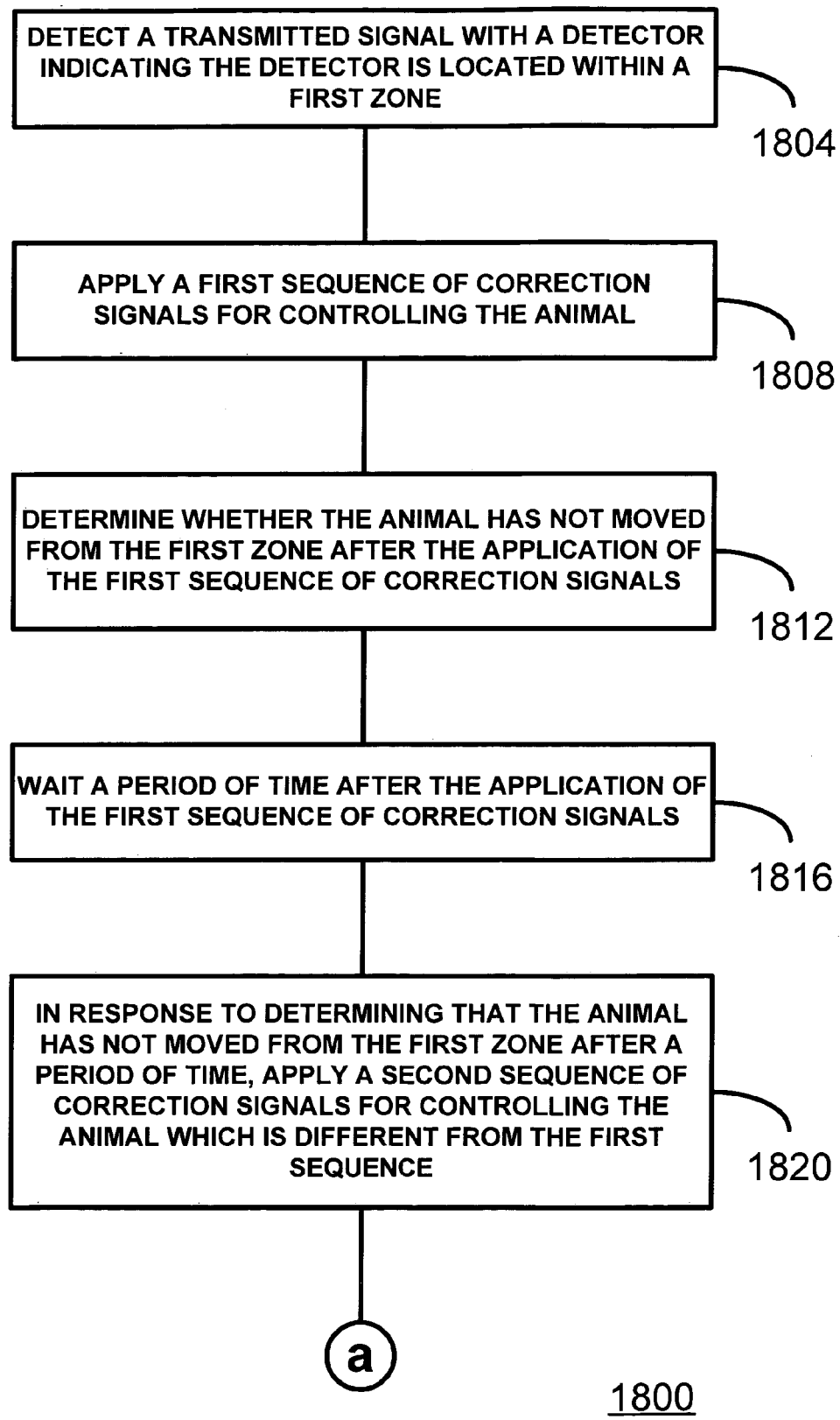
FIGS. 18A and 18B illustrate a flowchart demonstrating a method of applying a correction signal to an animal, according to one embodiment of the invention.
Figure 18B:
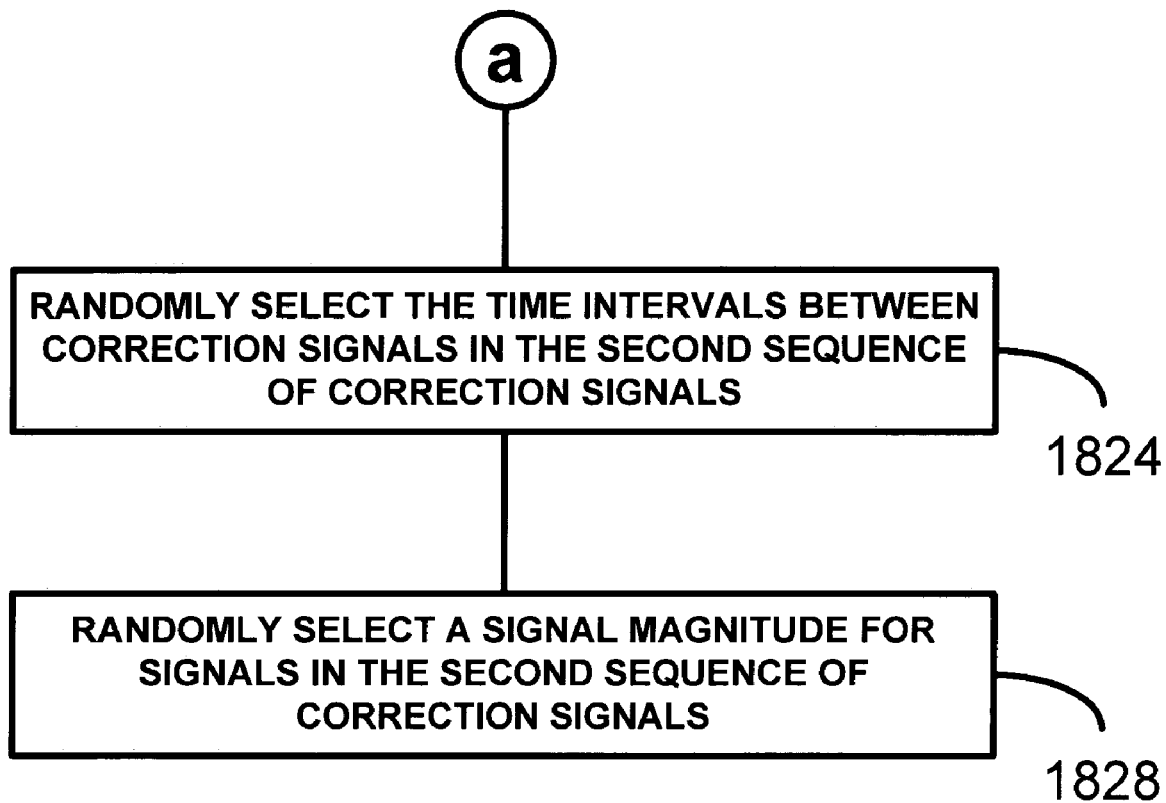

FIGS. 18a and 18b illustrate an example of a method of randomizing correction signals with a receiver assembly. In block 1804 of flowchart 1800, a transmitted signal is detected with a detector indicating that the detector is located within a first zone, such as an avoidance zone. In response, a first sequence of correction signals is applied for controlling an animal in block 1808. A determination is made as to whether the animal has been stimulated but not moved from the zone, in block 1812. As noted above, a time period can be measured from when the first stimulation in the sequence of stimulation signals was applied to the animal. Thus, as shown in block 1816, the receiver assembly can wait a period of time after the application of the first sequence of control signals. If the animal has not left the avoidance zone and a sufficient period of time has elapsed, a second sequence of correction signals can be applied to the animal, as shown in block 1820. The second sequence will be different from the first sequence so as to encourage the animal to leave the avoidance zone in view of the fact that the animal has apparently become accustomed to the first sequence. Thus, block 1824 shows that the receiver system can randomly select the time intervals between correction signals in the second sequence of correction signals. Furthermore, the receiver could also be configured to randomly select a signal magnitude for the correction signal in the second sequence of correction signals, as shown by block 1828.

Figure 19:
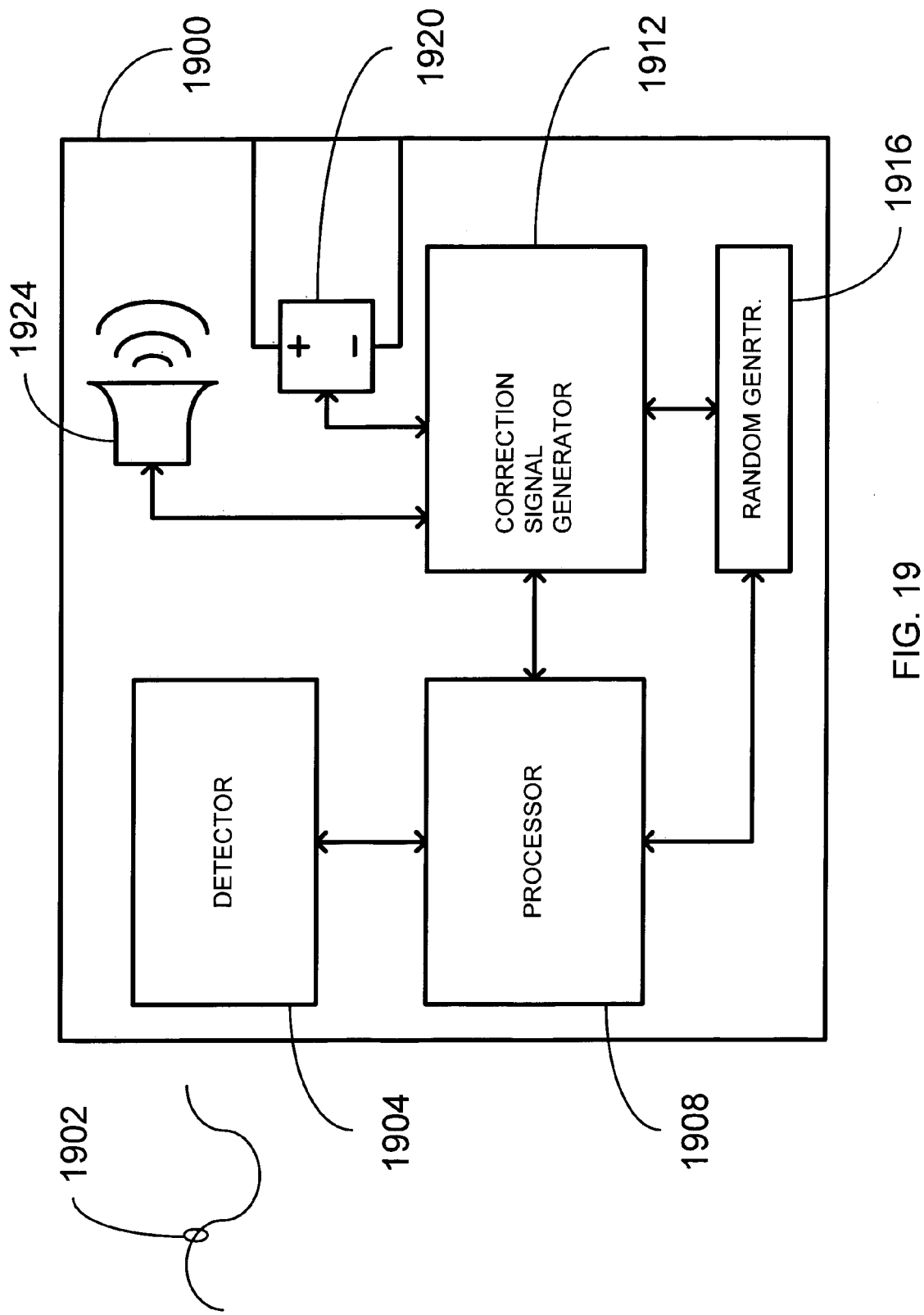
FIG. 19 illustrates the block diagram of a system for applying a correction signal to an animal, according to one embodiment of the invention.

FIG. 19 illustrates a system for generating a random pattern of stimulation signals. Namely, FIG. 19 shows a receiver assembly 1900 such as an animal collar assembly having a collar for coupling the receiver with the animal and a transducer for transmitting a signal to the animal. A transmitted signal from a transmitter is shown as signal 1902. The presence of the signal can be detected and received by detector 1904 and processed by processor 1908. The processor can then cause application of the correction signal through the use of the correction signal generator 1912. If the animal does not respond to the initial sequence of signals, random generator 1916 can be used to randomize the correction signal as explained above. The correction signal can be applied with speaker 1914 or electrical stimulation 1920.

For further background on electronic transmitter and receiver systems for use with animals the following U.S. patents are hereby incorporated by reference for all purposes: U.S. Pat. No. 5,435,271; U.S. Pat. No. 5,533,469; U.S. Pat. No. 5,870,973; U.S. Pat. No. 4,967,695; U.S. Pat. No. 5,636,597; U.S. Pat. No. 6,431,122; U.S. Pat. No. 5,559,498; U.S. Pat. No. 5,799,618; U.S. Pat. No. 6,058,889; U.S. Pat. No. 5,923,254; U.S. Pat. No. 6,073,589; U.S. Pat. No. 5,911,198; and U.S. Pat. No. 6,459,378.

While various embodiments of the invention have been described as methods or apparatus for implementing the invention, it should be understood that the invention can be implemented through code coupled to a computer, e.g., code resident on a computer or accessible by the computer. For example, software could be utilized to implement many of the methods discussed above. Thus, in addition to embodiments where the invention is accomplished by hardware, it is also noted that these embodiments can be accomplished through the use of an article of manufacture comprised of a computer usable medium having a computer readable program code embodied therein, which causes the enablement of the functions disclosed in this description. Therefore, it is desired that embodiments of the invention also be considered protected by this patent in their program code means as well.

It is also envisioned that embodiments of the invention could be accomplished as computer signals embodied in a carrier wave, as well as signals (e.g., electrical and optical) propagated through a transmission medium. Thus, the various information discussed above could be formatted in a structure, such as a data structure, and transmitted as an electrical signal through a transmission medium or stored on a computer readable medium.

It is also noted that many of the structures, materials, and acts recited herein can be recited as means for performing a function or steps for performing a function. Therefore, it should be understood that such language is entitled to cover all such structures, materials, or acts disclosed within this specification and their equivalents, including the matter incorporated by reference.

It is thought that the apparatuses and methods of the embodiments of the present invention and its attendant advantages will be understood from this specification. While the above is a complete description of specific embodiments of the invention, the above description should not be taken as limiting the scope of the invention as defined by the claims.

What is claimed is:

1. An apparatus for receiving an animal control signal, said apparatus comprising:
   a receiver for receiving an animal control signal from a transmitter, wherein said animal control signal is received without said receiver transmitting a signal to indicate to said transmitter the presence of said animal in a target zone, said target zone extending from said transmitter to a predetermined distance away from said transmitter;
   a memory for storing an identifier, wherein said identifier is associated with one of a plurality of animals in a household;
   a processor configured to initiate a routine for application of a correction signal to said animal if said animal control signal received from said transmitter matches said identifier so as to encourage said animal to leave said target zone and not come too close to said transmitter.

2. The apparatus as described in claim 1 and further comprising:
   a correction signal generator coupled with said processor.

3. The apparatus as described in claim 2 wherein said correction signal generator is configured to generate a sound in the audible range of said animal.

4. The apparatus as described in claim 2 wherein said correction signal generator is configured to generate a voltage for application to said animal.

5. The apparatus as described in claim 1 and further comprising:
   a collar for said animal.

6. The apparatus as described in claim 1 wherein said animal control signal comprises:
   a header;

a payload comprising at least eight bits wherein said payload comprises only two binary data "ones".

7. The apparatus as described in claim 6 wherein said payload identifies at least 21 different animals.

8. A method of receiving an animal control signal, said method comprising:
receiving an animal control signal from a transmitter, wherein said animal control signal is received without said receiver transmitting a signal to indicate to said transmitter the presence of said animal in a target zone, said target zone extending from said transmitter to a predetermined distance away from said transmitter;
storing an identifier in a memory, wherein said identifier is associated with one of a plurality of animals in a household;
providing a processor configured to initiate a routine for application of a correction signal to said animal if said animal control signal received from said transmitter matches said identifier so as to encourage said animal to leave said target zone and not come too close to said transmitter.

9. The method as described in claim 8 and further comprising:
generating a correction signal for use by said routine.

10. The method as described in claim 9 wherein said generating a correction signal comprises generating a sound in the audible range of said animal.

11. The method as described in claim 9 wherein said generating a correction signal comprises generating a voltage for application to said animal.

12. The method as described in claim 8 and further comprising:
providing a collar for use with said correction signal generator.

13. The method as described in claim 8 wherein said receiving an animal control signal comprises:
receiving header information;
receiving a payload comprising at least eight bits wherein said payload comprises only two binary data "ones".

14. The method as described in claim 13 wherein said payload identifies at least 21 different animals.

15. A method of transmitting an animal control signal for use in creating an avoidance zone in which said animal is not permitted, said method comprising:
providing a transmitter for use in creating an avoidance zone proximate to said transmitter;
configuring said transmitter to be capable of storing a plurality of identifiers wherein each of said plurality of identifiers is associated with a corresponding animal in a household;
selecting one of said plurality of identifiers;
repeatedly transmitting from said transmitter an automated animal control signal matching said selected identifier without receiving via an animal control receiver a signal to indicate to said transmitter the presence of said animal in said avoidance zone.

16. The method as described in claim 15 wherein said transmitting from said transmitter said animal control signal comprises:
transmitting a header;
transmitting a payload comprising at least eight bits wherein said payload comprises only two binary ones.

17. The apparatus as described in claim 16 wherein said payload identifies at least 21 different instructions.

18. An apparatus for transmitting an animal control signal, said apparatus comprising:
a transmitter;
a memory configured for storing a plurality of identifiers wherein each of said plurality of identifiers is associated with one of a plurality of animals in a household;
a processor operable for selecting one of said plurality of identifiers;
wherein said transmitter is operable for repeatedly transmitting an automated animal control signal matching said selected identifier.

19. The apparatus as described in claim 18 wherein said animal control signal comprises:
a header;
a payload comprising at least eight bits wherein said payload comprises only two binary ones.

20. The apparatus as described in claim 19 wherein said payload identifies at least 21 different instructions.

* * * * *

UNITED STATES PATENT AND TRADEMARK OFFICE
CERTIFICATE OF CORRECTION

PATENT NO. : 7,068,174 B2  Page 1 of 1
APPLICATION NO. : 10/830161
DATED : June 27, 2006
INVENTOR(S) : Donald L. Peinetti and William P. More It is certified that error appears in the above-identified patent and that said Letters Patent is hereby corrected as shown below:

Column 20, approximately line 20, delete "apparatus" and insert therefor -- method --.

Signed and Sealed this

First Day of May, 2007

JON W. DUDAS
*Director of the United States Patent and Trademark Office*